US008804765B2

(12) United States Patent
Pelletier et al.

(10) Patent No.: US 8,804,765 B2
(45) Date of Patent: Aug. 12, 2014

(54) DYNAMIC ROBUST HEADER COMPRESSION

(75) Inventors: Ghyslain Pelletier, Boden (SE); Lars-Erik Jonsson, Luleá (SE)

(73) Assignee: Optis Wireless Technology, LLC, Plano, TX (US)

(*) Notice: Subject to any disclaimer, the term of this patent is extended or adjusted under 35 U.S.C. 154(b) by 1461 days.

(21) Appl. No.: 11/424,600

(22) Filed: Jun. 16, 2006

(65) Prior Publication Data

US 2007/0058679 A1  Mar. 15, 2007

Related U.S. Application Data

(60) Provisional application No. 60/692,258, filed on Jun. 21, 2005.

(51) Int. Cl.
  *H04J 3/18* (2006.01)
  *H04L 29/06* (2006.01)

(52) U.S. Cl.
  CPC ......... *H04L 29/0604* (2013.01); *H04L 29/0653* (2013.01)
  USPC ............ 370/477; 370/202; 370/389; 370/392

(58) Field of Classification Search
  USPC ........................................................ 370/392
  See application file for complete search history.

(56) References Cited

U.S. PATENT DOCUMENTS

| | | | |
|---|---|---|---|
| 5,293,379 A | 3/1994 | Carr | |
| 6,388,584 B1 * | 5/2002 | Dorward et al. | ................. 341/51 |
| 6,496,543 B1 | 12/2002 | Zehavi | |
| 6,608,841 B1 | 8/2003 | Koodli | |
| 6,879,266 B1 | 4/2005 | Dye et al. | |
| 6,882,637 B1 | 4/2005 | Le et al. | |

(Continued)

FOREIGN PATENT DOCUMENTS

| | | |
|---|---|---|
| CN | 1409915 A | 4/2003 |
| WO | 0045516 A1 | 8/2000 |

(Continued)

OTHER PUBLICATIONS

V. Jacobson, Compressing TCP/IP headers, Feb. 1990, Network Working Group Request for Comments, The Internet Society.*

(Continued)

*Primary Examiner* — Faruk Hamza
*Assistant Examiner* — Aixa A. Guadalupe-Cruz
(74) *Attorney, Agent, or Firm* — Vincent J. Allen; Carstens & Cahoon, LLP

(57) ABSTRACT

A unit (25, 46) performs a compression operation or a decompression operation with respect to information for transmission in packets over a wireless link (36). The transmission over the wireless link is such that the packets may become reordered from a transmission sequence. The compression operation and the decompression operation involve a tradeoff of robustness and reordering depth. The robustness is an indicator of a degree of information loss over the link tolerated by the compression operation and the decompression operation; the reordering depth is a degree of packet reordering tolerated by the compression operation and the decompression operation. The unit dynamically adjusts the tradeoff of the robustness and the reordering depth in accordance with characteristics of the link. In an example embodiment, the information upon which the compression operation and the decompression operation is performed is sequence number information of a packet header.

20 Claims, 9 Drawing Sheets

(56) References Cited

U.S. PATENT DOCUMENTS

| | | | |
|---|---|---|---|
| 7,000,166 | B2 | 2/2006 | Hata et al. |
| 7,129,860 | B2 | 10/2006 | Alvarez et al. |
| 7,197,687 | B2 | 3/2007 | Imura et al. |
| 7,266,118 | B2 | 9/2007 | Ido et al. |
| 7,290,063 | B2 | 10/2007 | Kalliokulju et al. |
| 7,512,716 | B2 | 3/2009 | Pelletier et al. |
| 7,817,628 | B2 | 10/2010 | Pelletier et al. |
| 2002/0038385 | A1 | 3/2002 | Kalliokulju |
| 2002/0091860 | A1 | 7/2002 | Kalliokulju et al. |
| 2002/0093938 | A1 | 7/2002 | Tourunen |
| 2002/0097723 | A1 | 7/2002 | Tourunen et al. |
| 2003/0007512 | A1 | 1/2003 | Tourunen et al. |
| 2003/0009663 | A1 | 1/2003 | Pelletier et al. |
| 2004/0037359 | A1 | 2/2004 | Farineau et al. |
| 2004/0039830 | A1 | 2/2004 | Zhang et al. |
| 2004/0185860 | A1 | 9/2004 | Marjelund et al. |
| 2005/0090273 | A1 | 4/2005 | Jin et al. |
| 2005/0100056 | A1 | 5/2005 | Chuberre et al. |
| 2005/0170788 | A1 | 8/2005 | Tanaka et al. |
| 2005/0207408 | A1* | 9/2005 | Elliott .......................... 370/389 |
| 2006/0034249 | A1 | 2/2006 | Kallio et al. |
| 2006/0056455 | A1 | 3/2006 | Ruiz |
| 2006/0187846 | A1 | 8/2006 | Pelletier et al. |

FOREIGN PATENT DOCUMENTS

| | | |
|---|---|---|
| WO | 0108372 A2 | 2/2001 |
| WO | WO 01/28180 | 4/2001 |
| WO | 01/35534 A2 | 5/2001 |
| WO | 01/67715 A1 | 9/2001 |
| WO | 2005/076562 A1 | 8/2005 |
| WO | 2005/114948 A1 | 12/2005 |

OTHER PUBLICATIONS

S. Casner, V. Jacobson, Compressing IP/UDp/RTP Headers for Low-Speed Serial Links, Feb. 1999, Network Working Group Request for Comments, The Internet Society.*

Bormann et al., "Robust Header Compression (ROHC): Framework and four profiles: RTP, UDP, ESP and uncompressed", Jul. 2001, RFC 3045.*

Pelletier et al., "ROHC over Channels that can Reorder Packets", Oct. 2004.*

Pelletier et al., "ROHC over Channels that can Reorder Packets", Oct. 12, 2004.*

Bormann et al. "RFC 3095"; Jul. 2001.*

Kapoor et al, "Robust Header Compression (ROHC): Support for Reordering and Constant IP-ID", Internet Draft (work in progress), <draft-ietf-kapoor-rohc-rtp-new-requirements-00.txt>, Mar. 2005.

Van Jacobson. *Compressing TCP/IP Headers for Low-Speed Serial Links*. IETF RFC 1144, IETF Network Working Group, Feb. 1990.

Degermark et al, "*IP Header Compression*", IETF RFC 2507, IETF Network Working Group, Feb. 1999.

Casner et al., "*Compressing IP/UDP/RTP Headers for Low-Speed Serial Links*", IETF RFC 2508, IETF Network Working Group, Feb. 1999.

Bormann, RFC 3095 "[ROHC]", "RObust Header Compression (ROHC): Framework and four profiles: RTP, UDP, ESP, and uncompressed", RFC 3095, Internet Engineering Task Force, Jul. 2001.

Jonsson et al, *RObust Header Compression (ROHC): A Link-Layer Assisted ROHC Profile for IP/UDP/RTP*, IETF RFC 3242, Apr. 2002.

Liu et al, *Zero-byte Support for Bidirectional Reliable Mode (R-mode) in Extended Link-Layer Assisted RObust Header Compression (ROHC) Profile*, IETF RFC 3408, Dec. 2002.

Pelletier et al, *RObust Header Compression (ROHC): A Profile for TCP/IP (ROHC-TCP)*, Internet Draft (work in progress), <draft-ietf-rohc-tcp-09.txt>, Feb. 2005.

Bormann, *Robust Header Compression (ROHC) over PPP*, IETF RFC 3241, Apr. 2002.

Jonsson et al, *RObust Header Compression (ROHC): A compression profile for IP*, IETF RFC 3843, Jun. 2004.

Pelletier, *RObust Header Compression (ROHC): Profiles for UDP-Lite*, Internet Draft (work in progress), RFC 4019, Mar. 2005.

Ash et al, *Requirements for Header Compression over MPLS*, Internet Draft (work in progress), RFC 4247, Nov. 2005.

Ash et al., *Protocol Extensions for Header Compression Over MPLS*, RFC 4901, Jun. 2007.

Koren et al, *Enhanced Compressed RTP (CRTP) for Links with High Delay, Packet Loss and Reordering*. IETF RFC 3545, IETF Network Working Group, Jul. 2003.

Pelletier et al, "Robust Header Compression (ROHC) over Channels that can Reorder Packets", <draft-ietf-rohc-over-reordering-03.text>, May 2005.

International Search Report and Written Opinion mailed Dec. 5, 2006 in PCT application PCT/SE2006/050208.

International Preliminary Report on Patentability mailed Jan. 10, 2008 in PCT Application No. PCT/SE2006/050208.

Intt'l. Search Report and Written Opinion mailed Mar. 15, 2006 in PCT application No. PCT/SE2005/001624.

"Broadcast/Multicast Services— Stage 1", Revision A, 3GPP2 S.P0030-A Version 0.4.3, Jun. 12, 2003.

"Broadcast-Multicast Service (BCMCS) Framework Draft Document", Version 1.2, 3GPP2 BCMCS ad-hoc group, May 2003.

Jin et al, "*Header Compression for BCMCS*",QUALCOMM Incorporated, contribution to 3GPP2 BCMCS ad-hoc group, Oct. 2003.

3GPP TS 23.107 V5.10.0 (Sep. 2003), TSG SA; Quality of Service (QoS) concept and architecture.

3GPP TS 43.246 V0.6.0 (Jul. 2003), TSG GERAN; Multimedia Broadcast Multicast Service (MBMS) in the GERAN.

Pelletier et al, *RObust Header Compression (ROHC): TCP/IP Profile (ROHC-TCP)*, Internet Draft (work in progress), <draft-ietf-rohc-tcp-05.txt>, Oct. 2003.

Pelletier, *RObust Header Compression (ROHC): Profiles for UDP-Lite*, Internet Draft (work in progress), <draft-ietf-rohc-udp-lite-02.txt>, Dec. 2003.

Pelletier, *Robust Header Compression (ROHC): Context replication for ROHC profiles*, Internet Draft (work in progress), <draft-ietf-rohc-context-replication-01.txt>, Oct. 2003.

Kikuchi et al, *RTP Payload Format for MPEG-4 Audio/Visual Streams*, Standards Track, RFC 3016, Nov. 2000.

U.S. Office Action mailed Sep. 4, 2008 in related U.S. Appl. No. 10/987,218.

U.S. Office Action mailed Jan. 28, 2009 in related U.S. Appl. No. 10/987,218.

Chinese Office Action and English translation thereof mailed Sep. 25, 2009 in Chinese application 200580038919.9.

CN Office Action and English translation mailed May 11, 2010 in CN application 200580038919.9.

Chinese Office Action and English translation thereof mailed Nov. 19, 2010 in CN application 200580038919.

U.S. Final Office Action mailed Sep. 1, 2009 in related U.S. Appl. No. 10/987,218.

U.S. Office Action mailed Jan. 22, 2010 in related U.S. Appl. No. 10/987,218.

U.S. Final Office Action mailed Jul. 13, 2010 in related U.S. Appl. No. 10/987,218.

Notice of Allowance mailed Dec. 9, 2010 in related U.S. Appl. No. 01/987,218.

Pelletier et al, RObust Header Compression (ROHC): ROHC over Channels that can Reorder Packets <draft-pelletier-rohc-over-reordering-00.txt> Jun. 14, 2004, Network Working Group, Internet Draft.

* cited by examiner

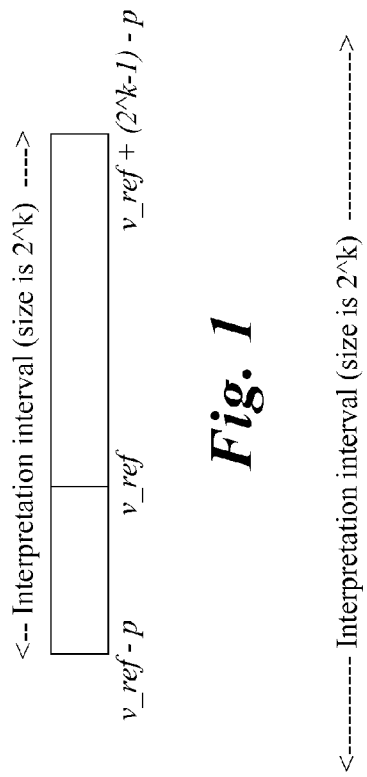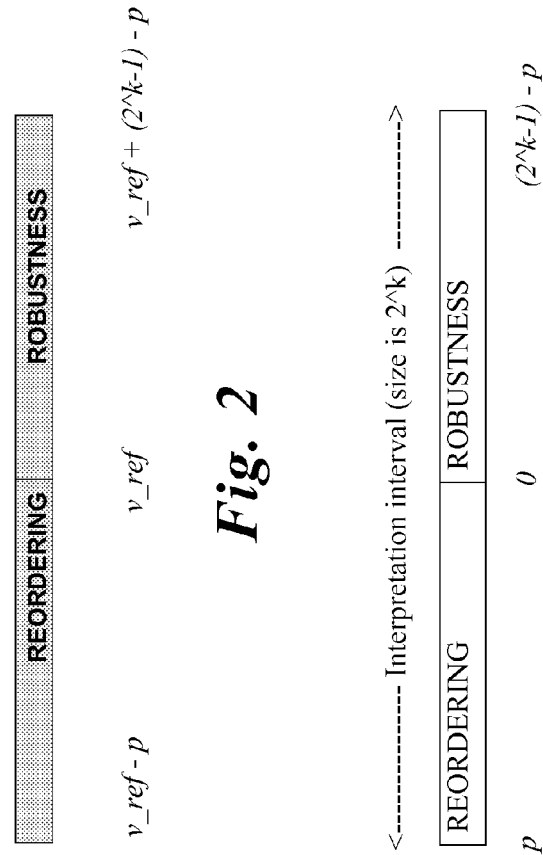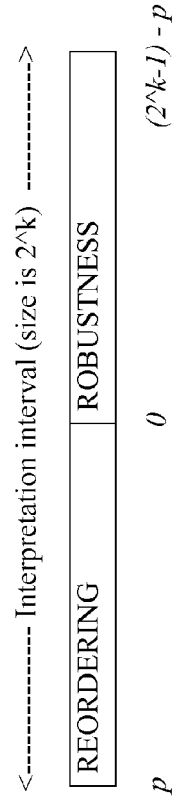

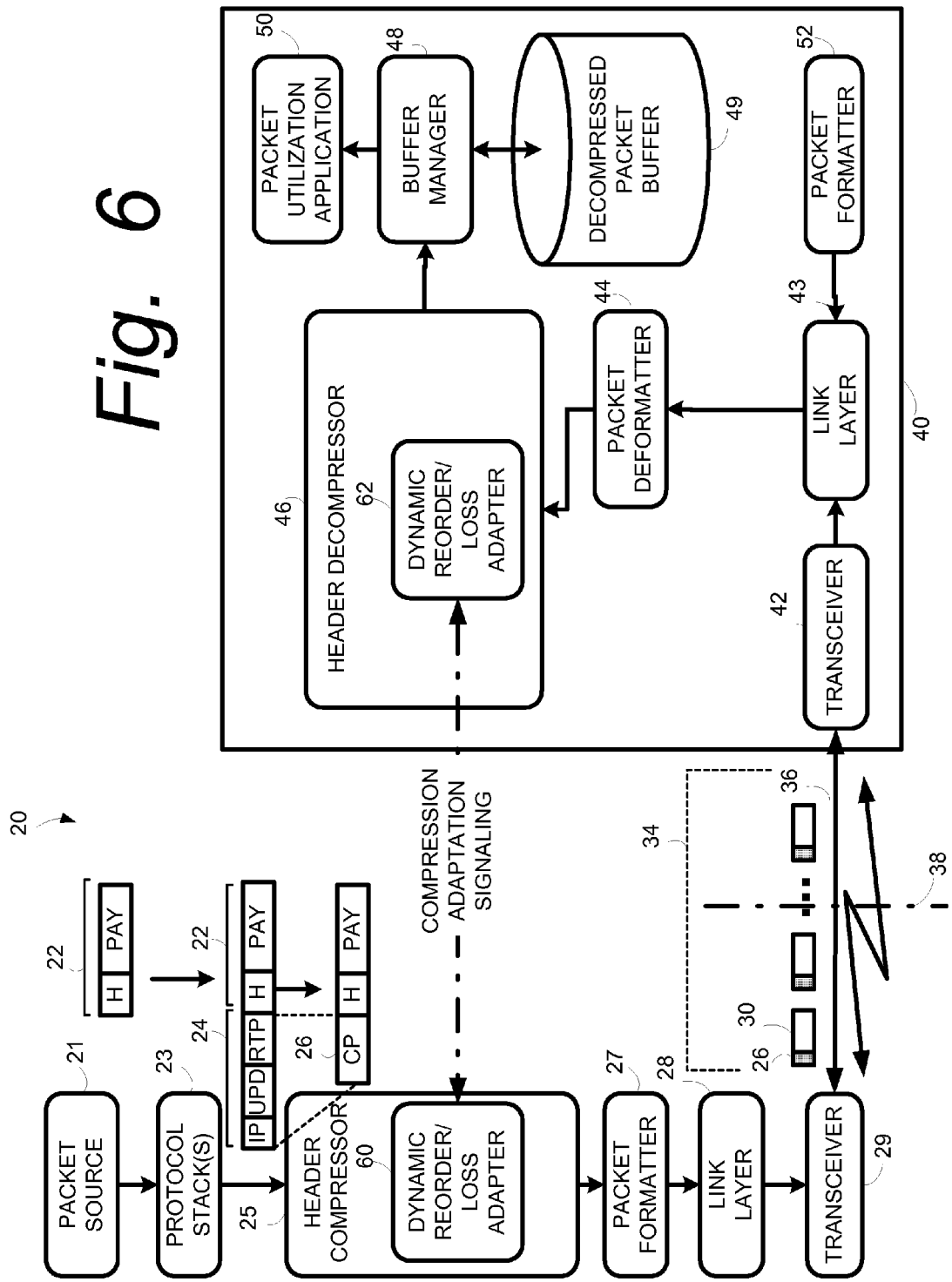

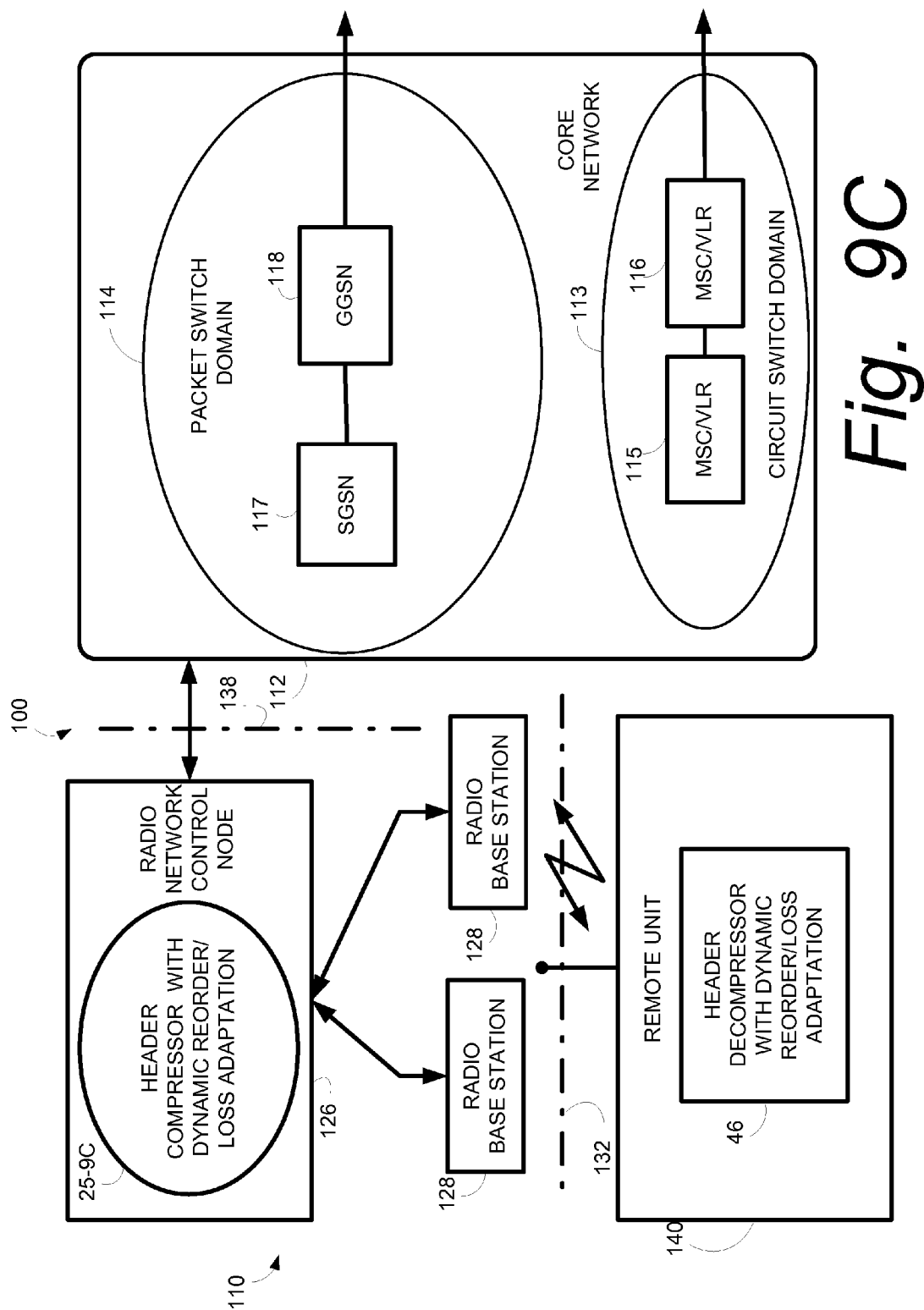

DYNAMIC ROBUST HEADER COMPRESSION

This application claims the benefit and priority of U.S. Provisional Patent Application 60/692,258, filed Jun. 21, 2005, entitled "METHODS FOR REORDERING/ROBUSTNESS ENCODING RATIO USING A VARIABLE LSB INTERPRETATION INTERVAL IN ROBUST HEADER COMPRESSION", which is incorporated herein by reference.

BACKGROUND

I. Technical Field

The present invention pertains generally to telecommunications, and particularly to the compression of headers of packets such as media packets. The technical field is illustrated by the following (all of which are incorporated herein by reference): (1) U.S. patent application Ser. No. 10/987,218, filed Nov. 15, 2004, entitled "Method and Apparatus for Handling Out-Of-Sequence Packets in Header Compression"; (2) U.S. patent application Ser. No. 10/673,345, filed Sep. 30, 2003, entitled "Header Compression Method"; (3) U.S. patent application Ser. No. 10/987,219, filed Nov. 15, 2004, entitled "Method and Apparatus for Header Compression With Transmission of Context Information Dependent Upon Media Characteristic"; (4) PCT application PCT/SE2005/000158 filed on Feb. 8, 2005: (5) U.S. Provisional Application Ser. No. 60/744,716, filed Apr. 12, 2006, entitled "Method for Combining Ciphering and Compression"; (6) U.S. Provisional Application Ser. No. 60/744,719, filed Apr. 12, 2006, entitled "Methods for Shared Sequence Numbering and Checksums Between Multiple Co-Located Functions"; (7) U.S. Provisional Application Ser. No. 60/744,721, filed Apr. 12, 2006, entitled "Methods for Combined Management of Cryptographic and Compression Contexts"; and (7) U.S. Provisional Application Ser. No. 60/744,724, filed Apr. 12, 2006, entitled "Methods for Secure Robust Header Compression".

The technology herein described is very generally applicable to header compression, and is not confined to current mechanisms to the ROHC algorithm and encoding methods, but rather proposes new mechanisms to better tailor compression based on the actual characteristics of the underlying link in the presence of reordering.

II. Related Art and Other Considerations

Related art includes PCT Patent Publication WO 01/35534 A2, titled "Variable-length encoding of compressed data". However, PCT Patent Publication WO 01/35534 A2 applies to coding of fields incrementing sequentially, in order to provide robustness against losses for those fields.

Other related documents include Kapoor, R., Haipeng J. and M. Kretz, *Robust Header Compression (ROHC). Support for Reordering and Constant IP-ID*, Internet Draft (work in progress), <draft-ietf-kapoor-rohc-rtp-new-requirements-00.txt>, March 2005, which is an IETF ROHC working group proposal for new requirements to ROHC. Kapoor provides suggestions on how to improve robustness to reordering for the LSB encoding of sequentially incrementing fields are proposed, but addresses the problem differently.

Due to the tremendous success of the Internet, it has become a challenging task to make use of the Internet Protocol (IP) over all kinds of links. However, because of the fact that the headers of the IP protocols are rather large, it is not always a simple task to make this come true for narrowband links, such as cellular links, for example. As an example, consider ordinary speech data transported by the protocols (IP, UDP, RTP) used for Voice-over-IP (VoIP), where the header may represent about 70% of the packet resulting in a very inefficient usage of the link.

The term "header compression" (HC) encompasses the art of minimizing the necessary bandwidth for information carried in headers on a per-hop basis over point-to-point links. Header compression techniques in general have a more than ten-year-old history within the Internet community. Several commonly used header compression protocols exist, such as the following: (1) Van Jacobson. *Compressing TCP/IP Headers for Low-Speed Serial Links*. IETF RFC 1144, IETF Network Working Group, February 1990; (2) Mikael Degermark, Björn Nordgren, Stephen Pink. *IP Header Compression*, IETF RFC 2507, IETF Network Working Group, February 1999; and (3) Steven Casner, Van Jacobson. *Compressing IP/UDP/RTP Headers for Low-Speed Serial Links*, IETF RFC 2508, IETF Network Working Group, February 1999, all of which are incorporated by reference herein in their entirety.

Header compression takes advantage of the fact that some fields in the headers are not changing within a flow, or change with small and/or predictable values. Header compression schemes make use of these characteristics and send static information only initially, while changing fields are sent with their absolute values or as differences from packet to packet. Completely random information has to be sent without any compression at all.

Header compression is thus an important component to make IP services over wireless, such as voice and video services, economically feasible. Header compression solutions have been developed by the Robust Header Compression (ROHC) Working Group of the Internet Engineering Task Force (IETF) to improve the efficiency of such services.

Robust Header Compression (ROHC), as defined in RFC 3095 ("[ROHC]", i.e., Bormann, C., "RObust Header Compression (ROHC): Framework and four profiles: RTP, UDP, ESP, and uncompressed", RFC 3095, Internet Engineering Task Force, July 2001), is an extensible framework for which profiles for compression of various protocols may be defined. For real-time multimedia services (e.g. voice, video), the application data is transported end-to-end within an IP/UDP/RTP stream. Header compression of IP/UDP/RTP is defined by the ROHC profile 0x0001 (ROHC RTP) and is applicable for Voice-over-IP (VoIP) services among others. The ROHC RTP header compression scheme has been designed to efficiently compress the IP/UDP/RTP headers over an arbitrary link layer.

A number of other ROHC profiles have also been defined for compression. Among these are (1) IP/UDP/RTP headers (described in: Jonsson, L. and G. Pelletier, *RObust Header Compression (ROHC). A Link-Layer Assisted ROHC Profile for IP/UDP/RTP*, IETF RFC 3242, April 2002; and Liu, Z and K. Le, *Zero-byte Support for Bidirectional Reliable Mode (R-mode) in Extended Link-Layer Assisted RObust Header Compression (ROHC) Profile*, IETF RFC 3408, December 2002); (2) IP only headers (described in: Jonsson, L. and G. Pelletier, *RObust Header Compression (ROHC): A compression profile for IP*, IETF RFC 3843, June 2004); (3) IP/TCP headers (described in: Pelletier, G., Jonsson, L., et al., *RObust Header Compression (ROHC): A Profile for TCP/IP (ROHC-TCP)*, Internet Draft (work in progress), <draft-ietf-rohc-tcp-11.txt>, Jan. 4, 2006); and (4) IP/UDP-Lite/RTP headers (described in: Pelletier, G., *RObust Header Compression (ROHC). Profiles for UDP-Lite*, IETF RFC 4019, March 2005). All RFCs cited herein are incorporated by reference herein in their entireties.

Except for negotiation (see also Bormann, C., *Robust Header Compression (ROHC) over PPP*, IETF RFC 3241, April 2002), ROHC profiles only requires framing and error detection to be provided by the link layer, while all other functionality is handled by the ROHC scheme itself.

A header compression scheme (such as a ROHC Profile) can be conceptualized and/or realized as a state machine. A challenging task is to keep the compressor and decompressor states, called contexts, consistent with each other, while keeping the header overhead as low as possible. There is one state machine for the compressor, and one state machine for the decompressor. The compressor state machine directly impacts the level of compression efficiency, as it is an important part of the logic controlling the choice of compressed packet type to be sent. The purpose of the decompressor state machine is mainly to provide the logic for feedback (if applicable) and to identify the packet types for which decompression may be attempted.

A compression context contains and maintains relevant information about past packets, and this information is used to compress and decompress subsequent packets. As explained in the ROHC documentation, the context of the compressor is the state it uses to compress a header. The context of the decompressor is the state it uses to decompress a header. Either of these or the two in combination are usually referred to as "context", when it is clear which is intended. The context contains relevant information from previous headers in the packet stream, such as static fields and possible reference values for compression and decompression. Moreover, additional information describing the packet stream is also part of the context, for example information about how the IP Identifier field changes and the typical inter-packet increase in sequence numbers or timestamps.

A packet that provides the means for the decompressor to verify successful decompression is a context-updating packet. Because decompression can be verified, this type of packet can update the context. For ROHC, context-updating packet types carry a Cyclic Redundancy Code (CRC) within their format; this is a checksum calculated over the original uncompressed header. This CRC is used to verify successful decompression of each packet; when successful, the context can be updated.

A packet that relies on other means to guarantee successful decompression—i.e. a packet format does not provide the means for the decompressor to verify successful decompression, and that only carries the information necessary for the decompression itself, is a self-contained packet. These packets do not update the context.

The ROHC profiles defined in RFC 3095, RFC 3242, RFC 3408, "IP-ONLY" (Jonsson, L. and G. Pelletier, *RObust Header Compression (ROHC): A compression profile for IP*, IETF RFC 3843, June 2004) and "ROHC-UDPLite" (Pelletier, G., *RObust Header Compression (ROHC): Profiles for UDP-Lite*, Internet Draft (work in progress), RFC 4019, April 2005) all support three different modes of operation. In short, for a specific context, the mode of operation controls the actions and the logic to perform as well as the packet types to use during different states of the header compression operation. Packet types and formats that are allowed may vary from one mode to the other. The Unidirectional mode (U-mode) is used at the beginning of any ROHC compression before any transition to other modes may occur. The Bidirectional Optimistic mode (O-mode) seeks to maximize the compression efficiency and sparse usage of the feedback channel. The Bidirectional Reliable mode (R-mode) seeks to maximize robustness against loss propagation and context damage propagation.

When in U-mode, packets are sent from compressor to decompressor only. The U-mode is thus usable over links where a return path from decompressor to compressor is either not desired or not available. Periodical refreshes are used in U-mode. The U-mode is particularly applicable to broadcast or multicast channels.

The O-mode is similar to the U-mode, with the difference that a feedback channel is used to send error recovery requests and (optionally) acknowledgements of significant context updates from the decompressor to compressor.

Note that for most ROHC profiles, the U-mode and the O-mode are often indistinctly referred to using the term U/O-mode. This is because the U-mode and the O-mode have rather similar characteristics, such as an identical set of packets formats for both modes as well as a similar logic to perform context updates. This logic is called the optimistic approach, and provides robustness against packet losses for the context update procedure in U/O-mode. See also [RFC 3095 [ROHC], section 5.3.1.1.1] for more details.

The R-mode differs significantly from the two other modes. In particular, the R-mode uses a few different packet types only understood and useful in this mode. However, the R-mode differs mainly by making a more extensive usage of the feedback channel and it uses a stricter logic for performing context updates. This logic is based on the secure reference principle, and provides robustness against packet losses for the context update procedure in R-mode. See also [RFC 3095 [ROHC], section 5.5.1.2] for more details.

The header compression profiles defined in RFC 3095 [ROHC] were designed with the assumption that the channel between the compressor and the decompressor will not reorder the header-compressed packets; the channel is required to maintain packet ordering for each compressed flow. This assumption was motivated because the channels initially considered as potential candidates to use ROHC did guarantee in-order delivery of packets. This assumption was useful to improve compression efficiency and the tolerance against packet loss, objectives that were ranked highest on the requirement list at the time. The profile for compression of IP headers only [IP-ONLY] and the profiles for UDP-Lite are essentially extensions to the profiles found in [RFC 3095 [ROHC]]. Therefore, these profiles also inherit the same assumption of in-order delivery.

A header compressor can use an "optimistic approach" to reduce header overhead when performing context updates. The compressor normally repeats the same update until it is fairly confident that the decompressor has successfully received the information. The number of consecutive packets needed to obtain this confidence is typically open to implementations, and this number is normally related to the packet loss characteristics of the link where header compression is used. All the packet types used with the optimistic approach are context updating.

A header compressor can use a "secure reference principle" to ensure that context synchronization between compressor and decompressor cannot be lost due to packet losses. Using the secure reference principle, the compressor obtains its confidence that the decompressor has successfully updated the context from a context-updating packet based on acknowledgements received by the decompressor. However, most packet types used with the secure reference principle are self-contained and thus not meant to update the context.

The IETF Audio-Video Transport (AVT) working group (WG) is working on header compression over multiple hops. While header compression is mainly intended to address low-speed links where bandwidth is scarce, saving bandwidth in backbone facilities is also of importance due to the high costs and considerable amount of traffic carried within. Header compression can be applied point-to-point between each node in the backbone network, however this requires that packets be decompressed and recompressed at each node. Processing can be lowered by performing compression between non-adjacent nodes in the backbone network, over a multi-hop path.

For example, a multi-hop path can be a Multi-Protocol Label Switched (MPLS) route in the backbone network, or an IP tunnel. A higher packet loss rate and possible reordering of packets characterize such virtual links, spanning over multiple hops. This can result from packets being re-routed, or simply discarded at a node, due to congestion or failure of a node. Requirements for header compression over multiple hops are described in Ash, J., Goode, B. and Hand, J., *Requirements for Header Compression over MPLS*, Internet Draft (work in progress), RFC 4247, November 2005 ["AVT-HC"], and Ash, J, et al., *Protocol Extensions For Header Compression Over MPLS*, IETF Internet Draft AVT Working Group, <draft-ietf-avt-hc-over-mpls-protocol-07.txt>, May 2006.

The IETF Robust Header Compression (ROHC) working group (WG) is working on robust header compression, and will likely soon target an update to its RFC 3095 main specification to adjust its compression profiles so that they can handle reordering while maintaining the excellent robustness characteristics of today's ROHC profiles.

An encoding method known as the Least Significant Bit (LSB) encoding method is used to encode header fields whose values are usually subject to small changes, such as sequence numbers (SN), e.g. the RTP protocol sequence number (SN) or the sequence number created at the decompressor when compressing protocols that do not have sequence numbering within their header format. The Least Significant Bit (LSB) encoding method, the k least significant bits of the field value are sent instead of the entire field value, where k is a positive integer. When receiving those bits, the decompressor derives the original value using a previously received value v_ref.

The Least Significant Bit (LSB) encoding method is guaranteed to give the correct result if both the compressor and decompressor use "interpretation intervals" in which the original value resides and in which the original value is the only value that has the same LSB bits as those transmitted. The concept of an interpretation interval is illustrated in FIG. 1. As illustrated in the interpretation interval of FIG. 1, the parameter p (known as the "interval shift parameter" or "offset") is used to shift the interpretation interval with respect to the previously received value v_ref.

Another encoding method which is a derivate of the Least Significant Bit (LSB) encoding method and which is known as Window-LSB encoding, uses a window of candidate v_ref. With the secure reference principle, acknowledgements from the decompressor allow the compressor to remove the values of v_ref that are older than the one acknowledged from the sliding window. LSB and W-LSB are described in [RFC 3095 [ROHC]]. More specifically, the interpretation interval can be clearly divided in two (sub)intervals, e.g., subinterval "reordering" and subinterval "robustness", as shown in FIG. 2.

In summary, correct interpretation of the encoded value using LSB coding depends on: (1) a sufficient number of encoded bits to recover the correct value within the correct interval; (2) a sufficiently large reordering subinterval to palliate or abate possible reordering; and (3) a sufficiently large robustness subinterval to palliate possible packet losses, or packets temporarily missing as they are being reordered.

One consequence of the secure reference principle (where not all packets are context updating) is that only the values acknowledged by the decompressor are included as references in the encoding sliding window (e.g. LSB or W-LSB coding). This robustness principle allows compressed packets to be sent with a format that does not include means for the decompressor to verify correct decompression (using, e.g., a checksum over the original uncompressed header), as the reception of LSB encoded bits applied to the secure reference is sufficient for correct decompression. The most optimal packet type in R-mode, packet type 0 (R-0), as well as packet type R-1*, do not carry any Cyclic Redundancy Code (CRC), that is a checksum calculated over the uncompressed header. These packet types account for most of the header-compressed traffic. Decompression entirely relies on the cumulative effect of previous updates to the secure reference, and the compressed data is based on the current value of the reference—which must be the same for both the compressor and the decompressor. This is suitable when in-order delivery between compressor and decompressor is guaranteed.

However, if reordering can occur, the consequence of this robustness principle is that the decompressor does not have the means to verify the decompression of self-contained packets, i.e., not meant to update the secure reference; these packets normally account for the majority of the packets exchanged between compressor and decompressor.

In order to minimize robustness issues when operating in R-mode, more sequence number (SN) bits may be sent and/or the interpretation interval can be modified to allow more values to be within the interpretation interval for reordering.

Now consider the 3GPP2 EV-DO (Evolution for Data Only) forward link, to provide a value for the worst-case reordering depth. For 3GPP2 EV-DO (Evolution for Data Only) forward link, the following expression provides the out-of-order delay, in ms:

delay(out-of-order)=[# transmission slots]*[interleaver depth]*[slot time period]

Consider a configuration using a 16-slot transmission on ARQ-1, followed by 1-slot transmission on ARQ-2:

[# transmission slots]=16−2 (accounts for the end of ARQ-2 transmission)

[interleaver depth]=4

[slot time period]=1.667 ms

The worst-case delay in the forward link is 106.24−3.334=102.906 ms. If Delayed-ARQ is used, there will be an additional time delta to recognize that a packet sent over ARQ-1 was not received and the same packet gets sent out again. Assuming the delta is 10 ms, the out-of-order depth becomes 2*106.24+10=222.48 ms.

So in other words, for a 20 ms service such as VoIP, the maximum reordering depth in packets on the forward link can be up to 222.48/20, which is roughly 11 packets.

Current state-of-the-art in header compression use packet formats that are predefined with a fixed number of bits for each fields. Some packet formats, through the usage of extensions for which presence is explicitly conveyed within the packet formats themselves, may provide additional bits to some fields. This is particularly useful to increase the interpretation interval of the LSB encoding.

Specifically, for ROHC profiles defined in RFC 3095 [ROHC], the interval shift parameter p is defined as follows:

For profiles 0x0001, 0x0003 and 0x0007:
p=1, when bits (SN)<=4;
p=2^(bits(SN)−5)−1 otherwise.

The interpretation interval for these conventional ROHC profiles is expressed by Table 1. As shown in Table 1, the ability for ROHC to handle packets that are out-of-order depends on the number of bits sent in each packet. For example, a sequentially late packet of type 0 (with either 4 or 6 bits of SN) sets the limit to one packet out of sequence for successful decompression to be possible.

TABLE 1

| bits (SN) k | Offset p (reordering) | $(2^k - 1) - p$ (losses) |
| --- | --- | --- |
| 4 | 1 | 14 |
| 5 | 0 | 31 |
| 6 | 1 | 62 |
| 7 | 3 | 124 |
| 8 | 7 | 248 |
| 9 | 15 | 496 |

On the other hand, for profiles 0x0002, 0x0004 and 0x0008, the "interval shift parameter" or "offset" parameter p=−1, independently of bits (SN). A value of p=−1 means that the interpretation interval offset can only take positive values, and that no sequentially late packet can be decompressed if reordering occurs over the link.

In summary, according to Table 1, in order to guarantee robustness for the 1×EV-DO link, at least 9 bits of the sequence number (SN) should be sent at any time. This would provide for a maximum reordering event of 300 ms, as well as abate 495 consecutive packet losses. Considering that this link is certainly reliable enough as to guarantee less than a few consecutive packet losses, and considering that having nine bits of sequence number forces the use of a packet type that is at least 2-3 octets larger than the smallest compressed packet size, the tradeoff is not well balanced.

The drawback of the above approach is that packet formats are tailored for only some specific scenarios. For example, with ROHC, packet formats are defined so that they can handle a maximum expected number of consecutive losses over the link, while handling a very small number of reordering (or in some cases, none at all).

There is thus a trade-off with this approach when designing robust packet formats that can handle both robustness to packet losses and a large enough reordering depth in a general manner, that will work for any type of link. When operating in the most efficient compression, many fields remain static and unchanged while others have established linear functions to a sequence number, such as the RTP sequence number (SN) field. Thus, simply carrying enough bits for that sequence number allows carrying changes for all header fields. The trade-off of using the LSB interpretation interval is illustrated in FIG. 3.

With the upcoming deployment of wireless links with higher bit rates and lower latencies (still relatively high latency with respect to the bit rate), the in-order delivery assumption is no longer applicable. Such links include 3GPP High-Speed Data Packet Access (HSDPA), 3GPP2 (Evolution for Data and Voice) EV-DV and 3GPP2 (Evolution for Data Only) EV-DO.

Thus, there is a need, as also described in Kapoor, R., Haipeng J. and M. Kretz, *Robust Header Compression (ROHC). Support for Reordering and Constant IP-ID*, Internet Draft (work in progress), <draft-ietf-kapoor-rohc-rtp-new-requirements-00.txt>, March 2005, for the different scenario of IP tunnels in the wired infrastructure, for header compression algorithms to be robust not only against packet losses, but also against reordering of packets. The problem thus lies in making the trade-off between the reordering and robustness intervals as efficient as possible, for any type of link characteristics/configuration, within the compression algorithm itself.

Work on header compression over multiple hops is ongoing in the IETF. The AVT WG is defining related requirements, see, e.g., Ash, J., Goode, B. and Hand, J., *Requirements for Header Compression over MPLS*, Internet Draft (work in progress), RFC 4247, November 2005, and Ash, J, et al., *Protocol Extensions For Header Compression Over MPLS*, IETF Internet Draft AVT Working Group, <draft-ietf-avt-hc-over-mpls-protocol-07.txt>, May 2006. It is expected that the working group will then complete work that will likely enable at least eCRTP (see, e.g., Koren, T., Casner, S., Geevarghese, J., Thompson B. and P. Ruddy, *Enhanced Compressed RTP (CRTP) for Links with High Delay, Packet Loss and Reordering*. IETF RFC 3545, IETF Network Working Group, July 2003) and ROHC (see, e.g., Carsten Bormann, et al. *RObust Header Compression (ROHC): Framework and four profiles. RTP, UDP, ESP and uncompressed*, IETF RFC 3095, April 2001) to be used over reordering links, as a result of these requirements.

As mentioned earlier, some header compression algorithms (e.g. ROHC) may have been designed with the assumption that the channel between compressor and decompressor delivers packets to the decompressor in the same order as when coming out of the compressor. This means that a state-of-the-art compressor will normally select the most optimal packet type based on the characteristics of the header to be compressed and based on the context, not based on the possible reordering characteristics of the link.

This also means that a state-of-the-art compression algorithm will not have the capability to handle both reordering and robustness in an efficient way for any type of reordering/loss pattern of a link layer.

FIG. 4 shows a typical example of the interpretation interval, e.g., state of the art with the LSB interpretation interval. The table of FIG. 4 shows values that clearly indicate a bias towards handling packet losses (robustness) with respect to handling reordering. A packet with 4 bits of SN would allow a reordering depth of 1 packet, but sustain up to 14 consecutive losses prior to its reception in order to be successfully decompressed.

For a link where the decompressor experiences that the loss pattern is almost non-existent (close to zero losses), but packets may be reordered to up to, e.g., 14 packets, it would require the compressor to use at least 9 bits of SN—much more than would be required in this case. In addition, the packet formats with the higher number of LSB bits normally are less efficient, normally carrying more than sequencing information.

Thus, summarizing in part the foregoing, the robustness and tolerance to reordering of the LSB encoding (e.g. in ROHC) are bound to the number of sequence number (SN) bits in the packet format, as well as the offset parameter p. In the prior art, the packet formats (PF) and the value of parameter p are defined statically for each profile. The RTP protocol sequence number (SN) in the most efficient compression operation is the only field for which bits are carried in compressed form, using, e.g., LSB coding (other fields can be decompressed based on the SN, or are not changing).

The interpretation interval defines how much reordering depth and how many consecutive packet losses the LSB coding will handle. Conventionally, both the offset parameter p and the number of sequence number (SN) bits in packets are fixed. However, the ratio of the intervals reordering/robustness is specific for different link technologies and configuration. For example, a high-speed link (1×EV-DO, HSDPA) can be reliable (~0 losses) but have high reordering (up to 220 ms), or real-time (~5-10% FER) with no reordering (0 retransmission).

What is needed, therefore, and an object of the present invention, are apparatus, techniques, and methods of header compression which are robust not only against packet losses, but also against reordering of packets.

SUMMARY

A unit performs a compression operation or a decompression operation with respect to information for transmission in packets over a wireless link. The transmission over the wireless link is such that the packets may become reordered from a transmission sequence. The compression operation and the decompression operation involve a tradeoff of robustness and reordering depth. The robustness is an indicator of a degree of information loss over the link tolerated by the compression operation and the decompression operation; the reordering depth is a degree of packet reordering tolerated by the compression operation and the decompression operation. The unit dynamically adjusts the tradeoff of the robustness and the reordering depth in accordance with characteristics of the link. In an example embodiment, the information upon which the compression operation and the decompression operation is performed is sequence number information of a packet header.

In some non-limiting, example embodiments, the unit which performs the dynamically adjustment is a compressor which performs the compression operation. The compressor signals, across the wireless link, at least one factor related to an adjustment of the tradeoff to a decompressor which performs the decompression operation. The compressor adjusts a packet format of the packets in accordance with characteristics of the link as perceived on a sending side of the wireless link.

In other non-limiting, example embodiments, the unit which performs the dynamically adjustment is a decompressor which performs the decompression operation. The decompressor signals, across the wireless link, a factor related to an adjustment of the tradeoff to a compressor which performs the compression operation. The decompressor adjusts a packet format of the packets in accordance with characteristics of the link as perceived on a receiving side of the wireless link. In some of these embodiments, the decompressor and the compressor synchronize a transition to a new packet format which reflects dynamic adjustment of the tradeoff. The adjustment of the tradeoff results in a new packet format. In some of these embodiments a field of the new packet format carries an indication of a size parameter of the new packet format, thereby obviating synchronization across the wireless link regarding the new packet format. In an example implementation, the size parameter is a number of bits in a sequence number field of the new packet format.

The tradeoff is expressed by an interpretation interval which, in turn, is expressed in terms of a number of compressed bits and an interpretation interval offset $P_{var}$. The reordering depth is dependent upon the interpretation interval offset $P_{var}$; the robustness is dependent upon the number of compressed bits and the interpretation interval offset $P_{var}$. In an example implementation, the unit dynamically adjusts the tradeoff by dynamically changing the number of compressed bits and by dynamically changing the interpretation interval offset. For example, the number of compressed bits can be expressed by a factor k and an enhancement factor S, and the unit dynamically changes the number of compressed bits by changing the enhancement factor S. The unit signals the enhancement factor S and the interpretation interval offset to a companion unit across the wireless link.

In one of its aspects herein described, the technology comprises a method of operating a telecommunications network. The method includes performing a compression operation with respect to packet header information to form compressed packet headers. The compression operation involves a tradeoff of robustness and reordering depth (the robustness being an indicator of a degree of information loss over the link tolerated by the compression operation, the reordering depth being a degree of packet reordering tolerated by the compression operation). The method also includes transmitting the compressed packet headers over a wireless link over which packets may become reordered from a transmission sequence. The method further includes dynamically adjusting the tradeoff of the robustness and the reordering depth in accordance with characteristics of the link.

Thus, in one of its example aspects the technology comprises: (1) signaling the value for p from compressor to decompressor; (2) making the entire packet format set of a variable size, based on a value S maintained in the context: S (+0, 1, 2 octets); and (3) signaling the context value S from the compressor to the decompressor.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a diagrammatic view of an interpretation interval in a least significant bit encoding method.

FIG. 2 is a diagrammatic view of an interpretation interval in a window-LSB encoding method.

FIG. 3 is a diagrammatic view illustrating trade-off using the LSB interpretation interval.

FIG. 6 is a diagrammatic view showing an example generic embodiment of a telecommunications system having a header compressor and a header decompressor which have the capacity to dynamically adjust a reordering/robustness tradeoff for header compression.

FIG. 9C is a schematic view of a particular telecommunications system which serves as an example context in which the present invention may be employed, wherein a compressor is included in radio network controller (RNC).

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Header compression systems, in various embodiments and modes described herein, have a capacity to dynamically adjust a tradeoff between reordering and robustness. Additionally and optionally, means are provided for synchronously adjusting packet formats to reflect the characteristics of the link.

Figure 4:
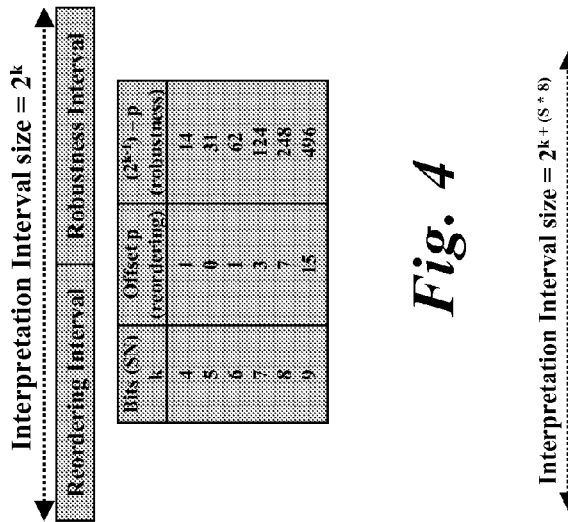
FIG. 4 is a diagrammatic view including a table for showing a typical example (state of the art) interpretation interval.
Figure 5:
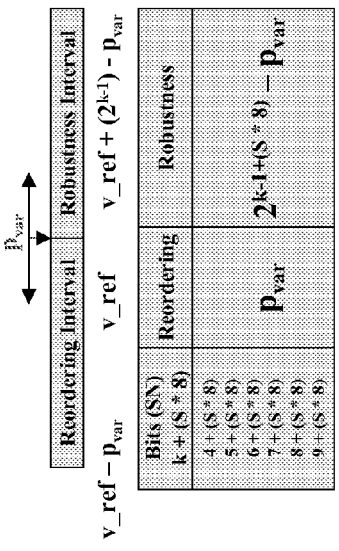
FIG. 5 is a diagrammatic view including a table for showing an interpretation interval with a variable value for offset parameter p and a variable factor S.

Dynamic adjustment of the reordering/robustness tradeoff is illustrated in FIG. 5. FIG. 5 shows an interpretation interval along with two new parameters, one or both of which are variable. In FIG. 5, the factor S (also known as a sequence number (SN) enhancement factor) is a factor applied to the packet formats, to increase the number of compressed sequence number (SN) bits. The parameter $P_{var}$ is a variable value for the parameter previously known as the as the "interval shift parameter" or "offset", and thus now is referred to also as the variable offset or the variable interval shift parameter, or as the dynamic offset or the dynamic interval shift parameter $P_{var}$. The parameter $P_{var}$ can be adjusted dynamically to provide a proper ratio between reordering and loss characteristics of the link.

More particularly, in accordance with example, non-limiting embodiments and modes discussed herein, the problems discussed above are addressed by, e.g., making the interpretation interval dynamic (the interpretation interval being used, e.g., for the Least Significant Bit (LSB) encoding used for the sequence number), and by signaling between compressor and decompressor the boundaries of the interval (e.g., the value of variable offset parameter $P_{var}$) as well as signaling the amount of compressed bits present in the packet formats (e.g., in excess of a certain minimum number of bits). These aspects are useful for both packet types for which decompression can be verified (e.g. using CRC and/or transport layer checksum), and those who rely on the secure reference principle for robustness. These techniques are particularly, but not exclusively, relevant to ROHC profiles.

The following describes potential example embodiments, based on the above approach and based on, but not limited to, the compressor and decompressor behavior of RFC-3095 [ROHC]. That is, the following embodiments use variable interval shift parameter $P_{var}$ and sequence number enhancement factor S as defined above.

FIG. 6 shows an example telecommunications network 20 wherein a stream of packets are supplied by a packet source 21. FIG. 6 shows, for example, a packet 22 (such as a media packet) having a payload (PAY) and header (H) being applied to a protocol stack 23. The particular protocols comprising the protocol stack can vary, and typically comprise an application protocol, under a transport protocol, under an Internet Protocol. In the particularly illustrated example, the protocol stacks 23 serve to affix protocol headers 24 (e.g., IP, UDP, and RTP) to the media packet 22. The packet 22 with its appended protocol headers 24 is applied to a packet header compressor 25. The packet compressor 25 compresses the protocol headers 24, resulted in a compressed header (CP) 26 for the packet. The header compressor 25 performs header compression according to any of many suitable header compression algorithms, either conventional (such as ROHC or SigComp, for example) or otherwise. After the header of the packet is compressed by header compressor 25, a packet formatter 27 incorporates the compressed header into a packet which is applied to a transceiver 29. The transceiver 29 serves to transmit the packet, such as packet 30 with its compressed header 26, in a flow 34 of packets over link 36 across an interface 38 to a remote unit 40. The flow 34 of packets, likely most with compressed headers, need not be continuous, but can instead be sporadic, depending on the type of packet service involved and the nature of the material included in the packet service (e.g., media type).

The packet stream issuing from packet source 21 of FIG. 6 can be realized in various ways. For examples, the packet stream can either (1) be pre-recorded and sent by a server (in this case the content (e.g., media) in the original packet 22 is already encoded); (2) come from a transcoder (which adapts the original content from a source to another (e.g., media) encoding potentially more suitable and/or supported by terminals); or (3) come from a source that performs real-time encoding (e.g., of live media). Thus, the header compressor can receive an input packet from any of several types of sources somewhere within the IP network. The packet source 21 can be any suitable source, such as a media server, for example, and may be located in a node or network common or remote from header compressor 25.

The aforementioned telecommunications elements, illustrated to the left of interface 38 in FIG. 6, are illustrated only as certain representative elements germane to the present discussion, and understandably do not constitute the whole of the telecommunications network 20, as many other unillustrated elements are also present. Moreover, the set of illustrated elements may be distributed throughout one or more nodes or networks (e.g., core networks or radio access networks), and in some instances an individual element itself may be distributed to plural platforms and/or plural nodes. Thus, for sake of simplification the illustrated elements are shown as being connected directly and successively together in the manner of FIG. 6.

While remote unit 40 has numerous elements, certain basic, representative elements suitable for an understanding of the header decompression performed by remote unit 40 are shown in FIG. 6. Among these elements are transceiver 42, which applies packets received on link 36 to link layer unit 43, and in turn to a packet deformatter 44. The packet deformatter 44 serves essentially to extract a compressed header from the received packet. After the compressed header is extracted, it is sent to header decompressor 46 for decompression. After the header of a packet has been decompressed by header decompressor 46, the packet including its decompressed header is stored by buffer manager 48 in decompressed packet buffer 49. The buffer manager 48 also retrieves decompressed packets from decompressed packet buffer 49 as needed for the packet utilization application 50, e.g., the particular application which is involved in receiving a media stream or the like. In addition, remote unit 40 includes a packet formatter 52 for preparing packets to be sent back across link 36 (as well as various unillustrated elements upstream from packet formatter 52).

The header compressor 25 serves to compress headers of packets (such as, but not limited to, media packets) which have been supplied by packet source 21 and possibly additionally encoded. In conjunction with its header compression, header compressor 25 sends context information to a decompressor for use by the decompressor in decompressing compressed headers of the media packets. As used herein, "context information" encompasses one or both of context initialization information and context refresh information. The context information can be included in the flow of packets to remote unit 40.

The header decompressor 46 is thus adapted for use with a remote unit 40 (which may take the form of, or also be known as, any of numerous devices/appellations such as mobile station, mobile terminal, wireless terminal, or user equipment unit). In the illustrated embodiment of FIG. 6, the header decompressor 46 happens to be situated in a wireless remote unit 40. As such, the remote unit 40 receives radio frequency transmissions over an air or radio interface, depicted by dashed-dotted line 38 in FIG. 6. Use of a wireless remote unit 40 is consistent with, for example, the RFCs cited herein and incorporated by reference. Yet it will be appreciated that the techniques described herein are not limited to use with any particular type of remote terminal or terminal interface, and that the techniques can instead or additionally be utilized for transmissions that are not wireless, or are by types of radiation or waves other than radio waves. Our-of sequence packet reception may occur in a wire link network or system, for example, when there are different physical paths, and thus different delays, for a same virtual link.

The remote unit 40 receives, over a link 36 such as an air interface, packets including packets having headers which have been compressed. The packets are generally transmitted over the link in a sequential order. However, the remote unit 40 is capable of handling out-of-sequence packets including those which have undergone reordering.

Thus, in the example generic embodiment illustrated, in FIG. 6, header compressor 25 performs a compression operation while header decompressor 46 performs a decompression operation with respect to header information (e.g., sequence number information of a packet header) transmitted in packets over wireless link 36. The transmission over the wireless link 36 is such that the packets may become reordered from a transmission sequence. The compression operation and the decompression operation involve a tradeoff of robustness and reordering depth. The robustness is an indicator of a degree of information loss over the link tolerated by the compression operation and the decompression operation; the reordering depth is a degree of packet reordering tolerated by the compression operation and the decompression operation.

In the generic example embodiment of FIG. 6, either header compressor 25 or header decompressor 46 can be the unit which dynamically adjusts the tradeoff of the robustness and the reordering depth in accordance with characteristics of the link. In order to facilitate the dynamic adjustment of the robustness/reordering depth tradeoff or ratio, header compressor 25 is provided with a compression side dynamic reorder/loss adapter 60 and header decompressor 46 is provided with a decompression side dynamic reorder/loss adapter 62. The two units involved in the dynamic adjustment, header compressor 25 and header decompressor 46, perform signaling between themselves for coordinating the dynamic adjustment of the robustness/reordering depth tradeoff or ratio. Such signaling is reflected in FIG. 6 by the signal labeled "compression adaptation signaling".

Figure 7A:
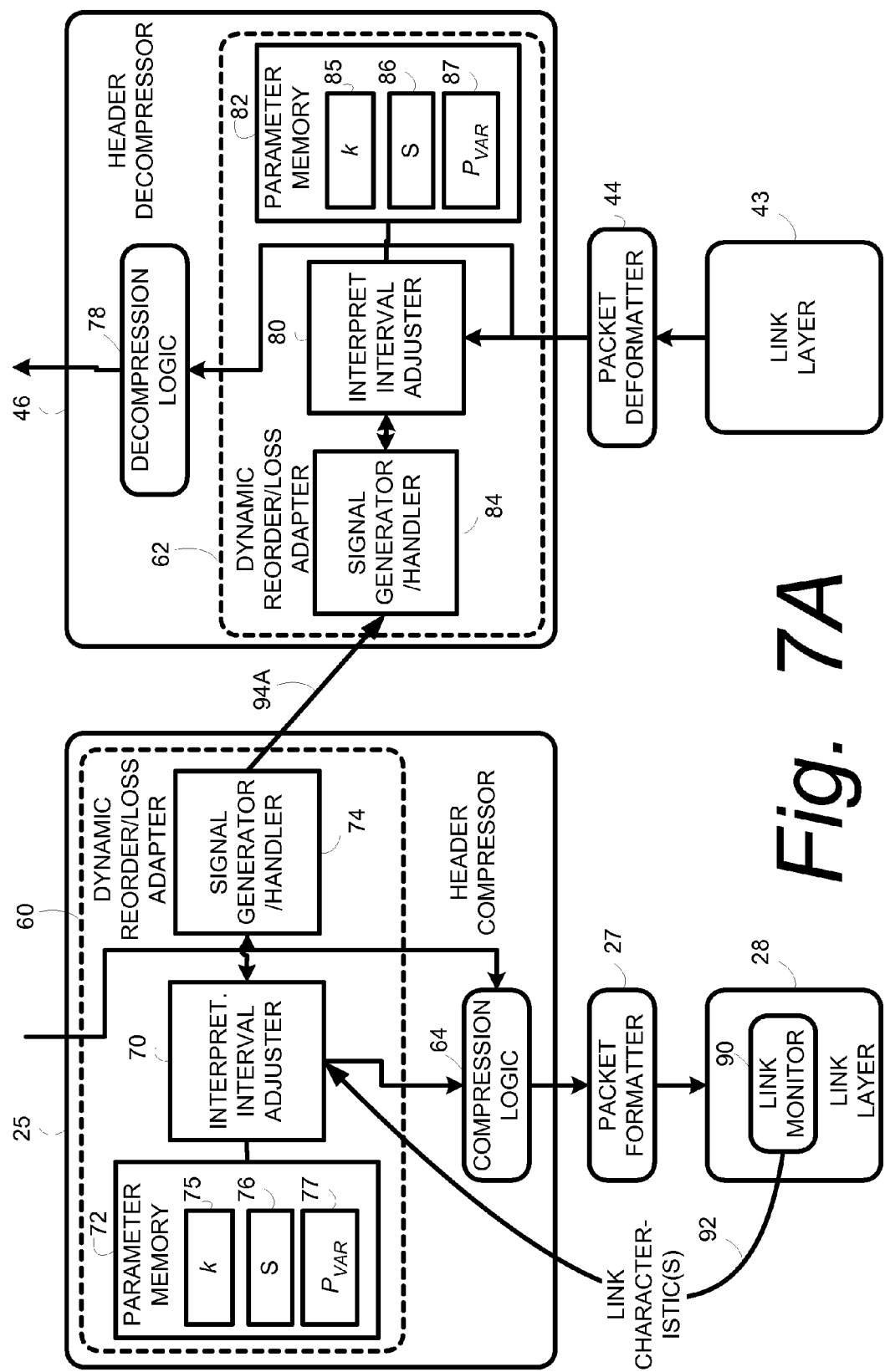
FIG. 7A is a diagrammatic view showing an example embodiment in which a header compressor controls dynamically adjustment of a reordering/robustness tradeoff for header compression.

FIG. 7A shows a non-limiting, example embodiment wherein the unit which performs the dynamically adjustment is the header compressor 25 which performs the compression operation. In the embodiment of FIG. 7A, header compressor 25 determines that a change of the dynamic adjustment of the robustness/reordering depth tradeoff or ratio is needed, and accordingly signals, across the wireless link 36, at least one factor related to an adjustment of the tradeoff to header decompressor 46 (which performs the decompression operation).

As understood from the foregoing, the robustness/reordering depth tradeoff or ratio is expressed by an interpretation interval which, in turn, is expressed in terms of a number of compressed bits and an interpretation interval offset. The reordering depth is dependent upon the interpretation interval offset ($P_{var}$); the robustness is dependent upon the number of compressed bits and the interpretation interval offset. In an example implementation, the unit dynamically adjusts the tradeoff by dynamically changing the number of compressed bits and by dynamically changing the interpretation interval offset ($P_{var}$). For example, the number of compressed bits can be expressed by a factor k and an enhancement factor S, and the unit dynamically changes the number of compressed bits by changing the enhancement factor S. The interpretation interval and the factors k, S (enhancement factor), and $P_{var}$ (interpretation interval offset) are understood with respect to FIG. 5.

The FIG. 7A embodiment shows the header compressor 25 as further comprising compression logic 64 and compression side dynamic reorder/loss adapter 60. The compression side dynamic reorder/loss adapter 60 is shown in FIG. 7A as further comprising an interpretation interval adjuster 70; parameter memory 72; and signal generator/handler 74. The parameter memory 72 is illustrated as having registers or memory locations 75, 76, and 77 for storing the factors k, S, and $P_{var}$.

The FIG. 7A embodiment also shows the header decompressor 46 as comprising decompression logic 78 and decompression side dynamic reorder/loss adapter 62. The decompression side dynamic reorder/loss adapter 62 is shown in FIG. 7A as further comprising an interpretation interval adjuster 80; parameter memory 82; and signal generator/handler 84. The parameter memory 82 is illustrated as having registers or memory locations 85, 86, and 87 for storing the parameters k, S, and $P_{var}$.

In the FIG. 7A embodiment, compression logic 64 receives, from the protocol stacks 23, the packet-to-be-header compressed, and performs the compression consistent with the factors and interpretation interval in effect (as informed by interpretation interval adjuster 70). The interpretation interval adjuster 70 obtains the factor values, e.g., the values of factors k, S, and $P_{var}$, from respective memory locations 75, 76, and 77.

Further, when needed, header compressor 25 adjusts a packet format of the packets in accordance with characteristics of the link as perceived on a sending side of the wireless link. In particular, FIG. 7A shows link layer 28 has having a link layer monitor 90. As indicated by arrow 92, the link layer monitor 90 sends to the interpretation interval adjuster 70 of header compressor 25 any suitable link characteristic(s) information germane to the compression/decompression operation. Such link characteristic(s) information can include, for example, one or more of round-trip time (RTT), delays, a number of retransmissions (radio link control (RLC) and/or Hybrid Automatic Retransmission ReQuest (H-ARQ), handover events, buffer levels, change in configuration, change in quality of service (QoS) parameters, link reset, Service Data Unit (SD) discards, and bit error rate measurements, etc. Should the factors S and/or $P_{var}$, require change (e.g., a new value) as a result of changed link condition(s), new values for the factors S and $P_{var}$, as determined by interpretation interval adjuster 70, are stored in respective memory locations 76 and 77.

Further, in the FIG. 7A embodiment, as the compression adaptation signaling indicated by arrow 94A, the signal generator/handler 74 of header compressor 25 signals the enhancement factor S and the interpretation interval offset $P_{var}$ to header decompressor 46 across the wireless link. The new values of the factors are noted and used by interpretation interval adjuster 80 for the decompression operation, and stored in respective memory locations 86 and 87.

Figures 8A, 8B:
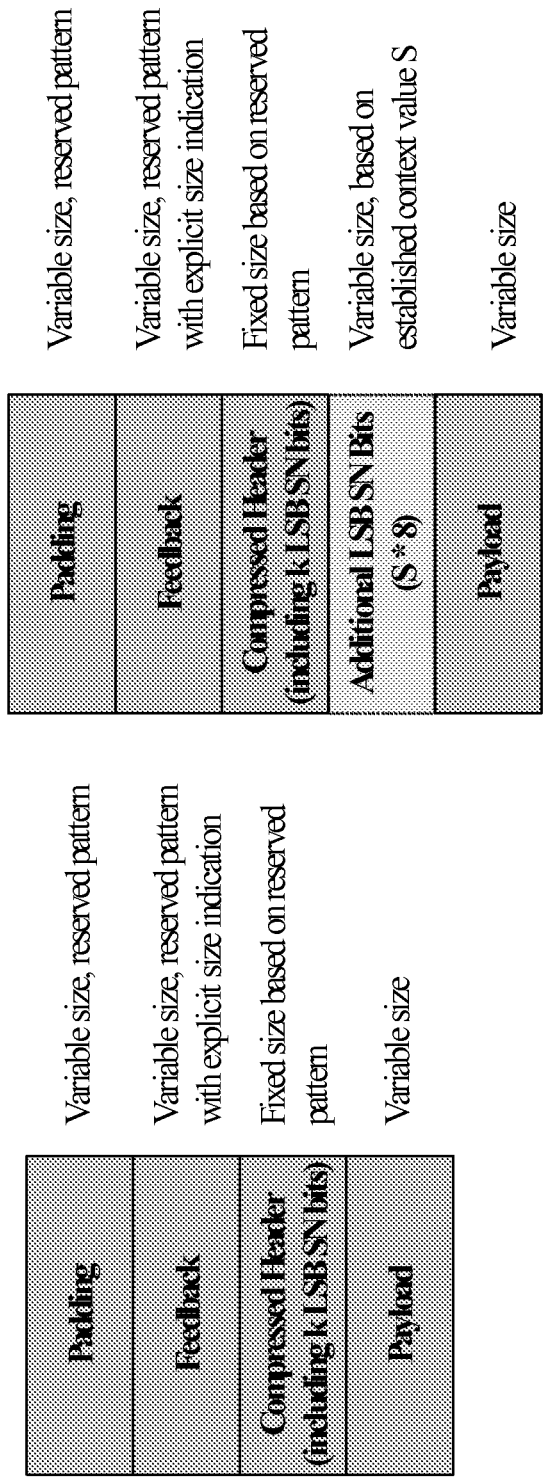
FIG. 8A and FIG. 8B are diagrammatic views showing packet types in the state-of-the-art case and new packet formats, respectively.

Thus, in the first example embodiment of FIG. 7A, header compressor 25 signals the value of $P_{var}$ and S. The number of least significant (LSB) sequence number (SN) bits in the packet formats expand by a factor of S. That is, header compressor 25 signals (as compression adaptation signaling indicated by arrow 94A) the value of $P_{var}$ and S, effectively establishing a context entry at header decompressor 46. Once this is done, each compressed header generated by header compressor 25 has S number of additional sequence number octets (or bits, in the case of packet formats that are not aligned to an octet boundary) with respect to the static definition of the formats. The values may be re-established at any time using the same procedure. These values may be provided from out-of-band signaling from the receiving node, or header compressor 25 may use local configuration parameters that accurately describe the link layer behavior. "Out-of-band signaling" means, in essence, using another protocol between the same end nodes, whose purpose is to signal information on the behalf of other protocol layers. Out-of-band signaling can use the same or a different physical channel, but a different logical channel. The point is that it is outside the definition of the messages exchanged within the header compression protocol. The packet types in the state-of-the-art case and the new packet formats are shown in FIG. 8A and FIG. 8B, respectively.

Figure 7B:
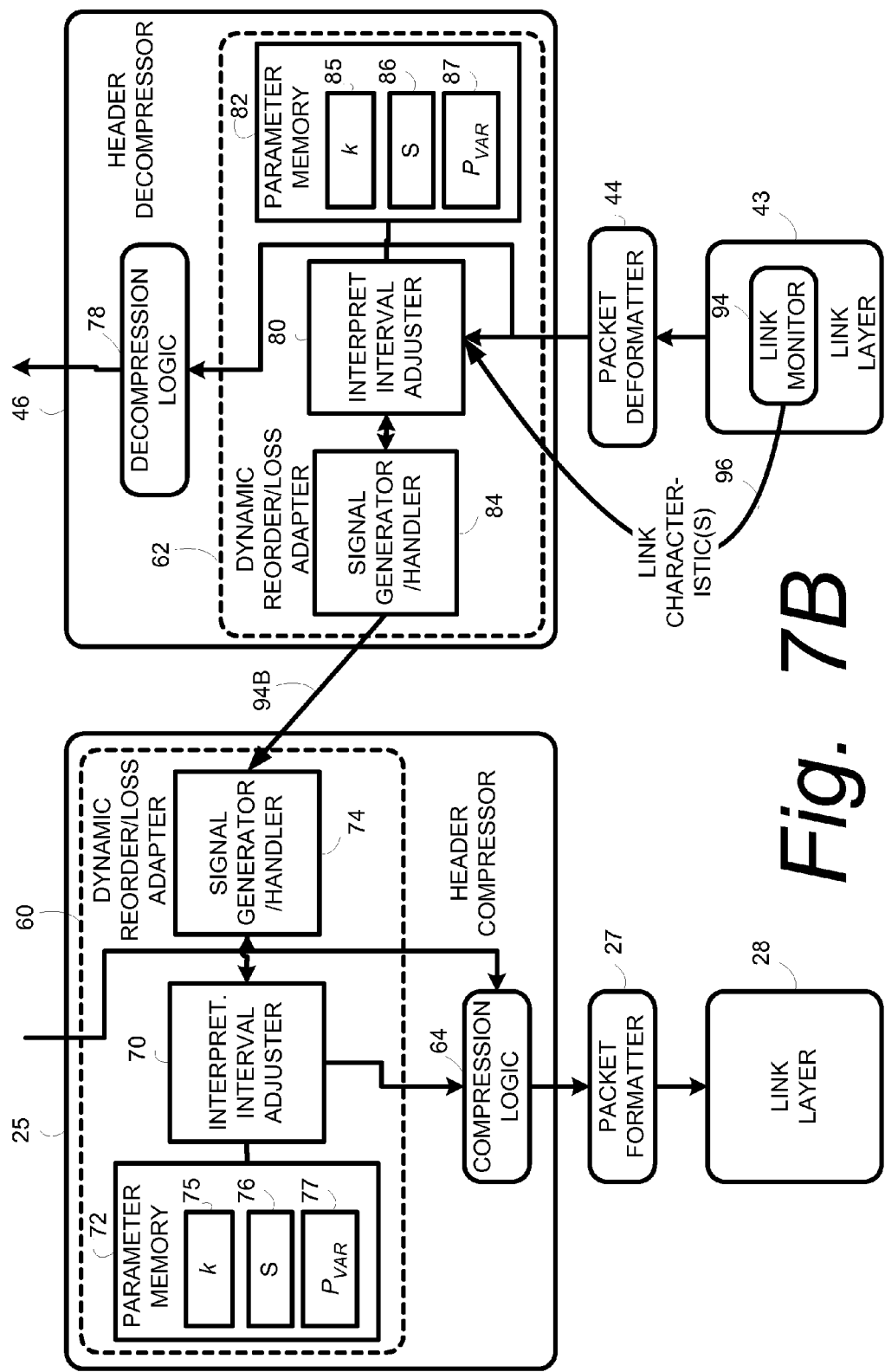
FIG. 7B is a diagrammatic view showing an example embodiment in which a header decompressor controls dynamically adjustment of a reordering/robustness tradeoff for header compression.

In the non-limiting, example embodiment of FIG. 7B, the unit which performs the dynamically adjustment is the header decompressor 46 which performs the decompression operation. In the FIG. 7B embodiment, the header decompressor 46 determines that a change of the dynamic adjustment of the robustness/reordering depth tradeoff or ratio is needed, and accordingly signals, across the wireless link, at least one factor related to an adjustment of the tradeoff to header compressor 25 (which performs the compression operation). The header decompressor 46 adjusts a packet format of the packets in accordance with characteristics of the link as perceived on a receiving side of the wireless link.

As with the FIG. 7A embodiment, the FIG. 7B embodiment shows the header compressor 25 as further comprising compression logic 64 and compression side dynamic reorder/loss adapter 60, with the compression side dynamic reorder/loss adapter 60 further comprising an interpretation interval adjuster 70; parameter memory 72; and signal generator/handler 74. The parameter memory 72 is illustrated as having registers or memory locations 75, 76, and 77 for storing the parameters k, S, and $P_{var}$. Likewise, the FIG. 7B embodiment also shows the header decompressor 46 as comprising decompression logic 78 and decompression side dynamic reorder/loss adapter 62. The decompression side dynamic reorder/loss adapter 62 is also shown in FIG. 7B as further comprising an interpretation interval adjuster 80; parameter memory 82; and signal generator/handler 84. The parameter memory 82 is illustrated as having registers or memory locations 85, 86, and 87 for storing the parameters k, S, and $P_{var}$.

In the FIG. 7B embodiment, header decompressor 46 adjusts a packet format of the packets in accordance with characteristics of the link as perceived on the receiving side of the wireless link. In particular, FIG. 7B shows link layer unit/logic 43 has having a link layer monitor 94. As indicated by arrow 96, the link layer monitor 94 sends to interpretation interval adjuster 80 of header decompressor 46 any suitable link characteristic(s) information germane to the compression/decompression operation. The link characteristic(s) information can be, for example, the characteristics or parameters listed previously with regard to monitor 90. Should the factors S and/or $P_{var}$, require change (e.g., a new value) as a result of changed link condition(s), new values for the factors S and $P_{var}$, as determined by interpretation interval adjuster 80, are stored in respective memory locations 86 and 87.

Further, in the FIG. 7B embodiment, as the compression adaptation signaling indicated by arrow 94B, the signal generator/handler 84 of header decompressor 46 signals the enhancement factor S and the interpretation interval offset $P_{var}$ to header compressor 25 across the wireless link. The new values of the factors are noted and used by interpretation interval adjuster 70 for the compression operation, and stored in respective memory locations 76 and 77.

Thus, in the second example embodiment of FIG. 7B, the header decompressor 46 signals the value of $P_{var}$ and S to header compressor 25. A three-way handshake can be employed for synchronization between header compressor 25 and header decompressor 46. The number of least significant (LSB) sequence number (SN) bits in the packet formats expand by a factor of S. That is, in one implementation, initially header compressor 25 and header decompressor 46 may use default values for $P_{var}$ and S. The decompressor side (e.g., header decompressor 46) monitors the behavior of the link and signals new values for $P_{var}$ and S back to header compressor 25.

Since the signaling of the FIG. 7B embodiment may affect the packet formats, header compressor 25 and header decompressor 46 may have to use a three-way handshake to properly synchronize the transition to the new formats. In such three-way handshake generally, as a first step header decompressor 46 sends a message (including, e.g., values for $P_{var}$ and S) to header compressor 25. As a second step, header compressor 25 responds to header decompressor 46 with a confirmation or acknowledgement message, confirming that header compressor 25 received the first step message with the values. As a third step, header decompressor 46 acts upon receipt of the confirmation message (the second step message) from header compressor 25. In the particular scenario of FIG. 7B, the task is to change the interpretation of packet format from a first packet format interpretation to a second packet format interpretation, e.g., how a message exchanged between header decompressor 46 and header compressor 25 is pared by header compressor 25.

Describing then the three-way handshake in more detail, header compressor 25 sends a compressed header format that can be interpreted no matter if the first packet format interpretation or the second packet format interpretation is used (e.g. a format common to both interpretations, or a format which carries enough information to determine if the first packet format interpretation or the second packet format interpretation shall be used to interpret the format used to perform the transaction). The header compressor 25 can continue to use this "common" format until header compressor 25 receives a confirmation from header decompressor 46. The header decompressor 46 receives the message, and acknowledges (ACKs) the received message (e.g., using the sequence number (SN) of the packet received in the feedback message). The header compressor 25 then receives the acknowledgement (ACK) for a packet that changed the interpretation, and knows the sequence number. The header compressor 25 thus knows that header decompressor 46 can now start properly interpreting the new format. Accordingly, header compressor 25 can then start using the new packet format.

Once this handshake is done, each compressed header generated by header compressor 25 has S number of additional sequence number octets (or bits, in the case of packet formats that are not aligned to an octet boundary) with respect to the static definition of the formats. The values may be re-established at any time using the same procedure.

A third example embodiment utilizes self-describing variable encoding values applied to LSB coded SN bits. The header compressor 25 uses a self-describing variable encoding when sending LSB-coded SN bits. The header decompressor 46 may signal back to the header compressor 25 a more suitable value of $P_{var}$ and/or maximum reordering depth and consecutive losses expected for the link using feedback; the compressor may use configured values. In the third example embodiment, the number of LSB SN bits in the packet formats may expand without any handshake between header compressor 25 and header decompressor 46.

Considering the third example embodiment in more detail, initially the header compressor 25 may use default values for $P_{var}$. The header compressor 25 applies a self-describing variable encoding to the LSB-coded SN bits; in other words, a bit pattern at the beginning of the field is used to signal the number of sequence number octets (or bits) that constitute the sequence number (SN) field. This is, in essence, Self-Describing Variable Length (SDVL) encoding, which is described in RFC 3095, section 4.5.6, page 35. A field that can be used in this way is any field for which only some of the bits need be sent to recover properly its original value, e.g., when using LSB bits. For example, if the field starts with 0, then there is only one octet; if the field starts with 10, then there are two octets; with 110 there is 3 octets and so on.

The header decompressor 46 may monitor the behavior of the link and signal new values for $P_{var}$, or send reports on the maximum amount of reordering and robustness possibly observed at the receiving end. Even thought this signaling may affect the number of additional bits sent in packet formats, the header compressor 25 and header decompressor 46 do not have to synchronize any transition to new formats since the packet format itself already carries the information necessary to derive the number of bits for that field. The values may be re-established at any time using the same procedure.

The person skilled in the art will appreciate that the compression adaptation signaling indicated by arrow 94A in FIG. 7A and indicated by arrow 94B in FIG. 7B is also carried over the wireless link 36. The compression adaptation signaling indicated by arrow 94A in FIG. 7A and indicated by arrow 94B in FIG. 7B can be in-band signaling or out-of-band signaling. The illustration of arrows between signal generator/handler 74 and signal generator/handler 84 is primarily for emphasizing the communication endpoints of such signaling.

The compression and/or decompression elements and functionalities described above may be implemented, either separately or collectively, using individual hardware circuits, using software functioning in conjunction with one or more suitably programmed digital microprocessors or general purpose computers, using an application specific integrated circuit (ASIC), and/or using one or more digital signal processors (DSPs).

The generic terms "header compression", "header compressor" and "header decompressor" are used to show that the applicability of all of the above ideas is not limited to any specific header compression scheme, although it is certainly of more relevance to RFC 3095 [ROHC], [IP-ONLY] and [ROHC-UDPLite].

Figure 9A:
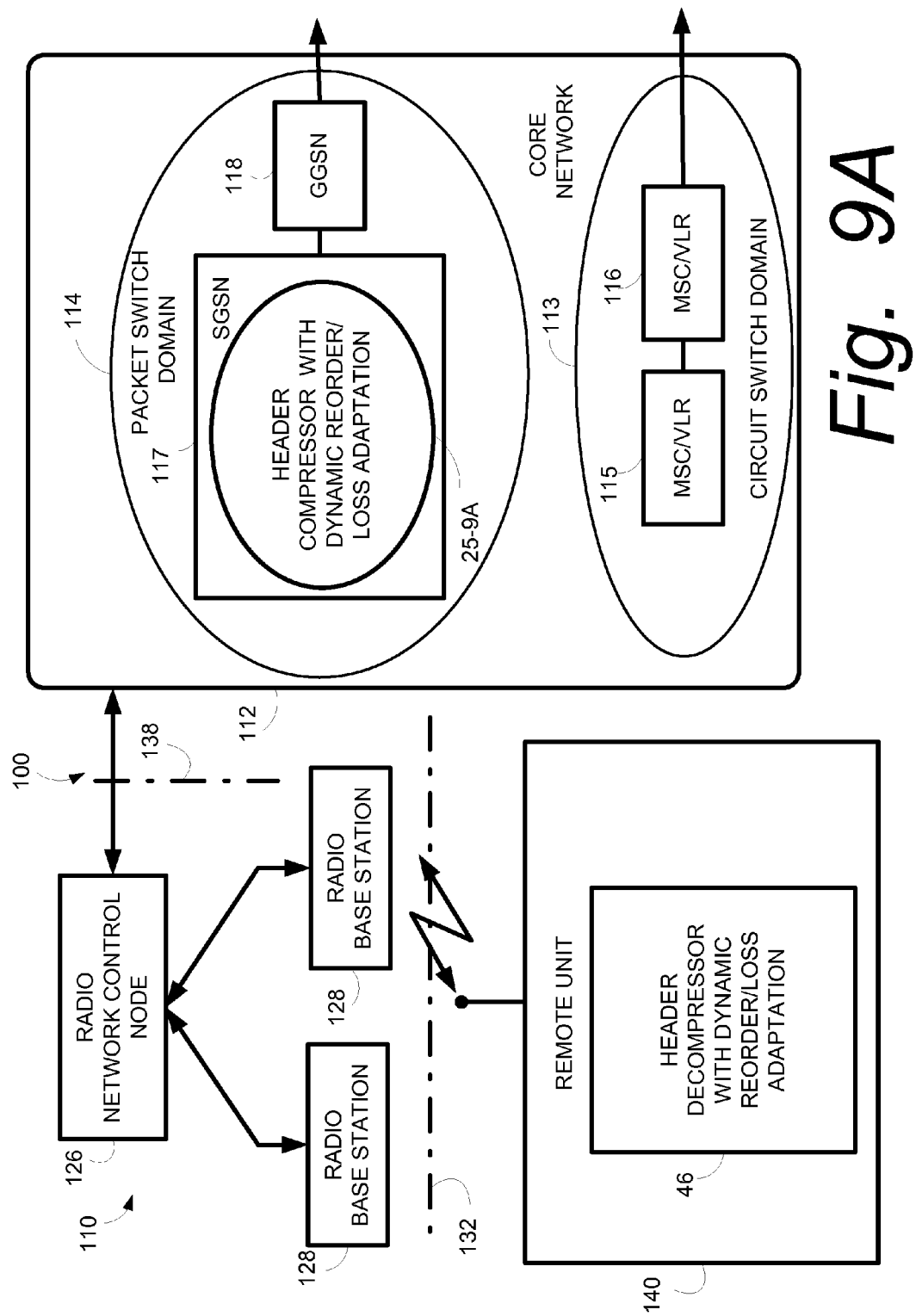
FIG. 9A is a schematic view of a particular telecommunications system which serves as an example context in which the present invention may be employed, and wherein a header compressor is included in a General Packet Radio Service (GPRS) Service (SGSN) node.

A non-limiting example environment of implementation of the foregoing network is a telecommunications network 100 such as that shown in FIG. 9A. The example telecommunications network 100 includes both a radio access network 110 and a core network 112. The core network 112 is shown as comprising a circuit switch domain 113 and a packet switch domain 114. In the particularly illustrated example, the circuit switch domain 113 (e.g., a PSTN/ISDN connection-oriented network) is shown as comprising a Mobile Switching Center (MSC)/Visiting Location Register node 115 and a Gateway MSC node 116. The packet switch domain 114 is illustrated in example fashion as including a General Packet Radio Service (GPRS) Service (SGSN) node 117 which is connected to a Gateway General Packet Radio Service (GPRS) support node (GGSN) 118.

Gateway GRPS support node (GGSN) 118 provides the interface towards the packet-switched networks (e.g., the Internet, X.25 external networks) and as such serves to translate data formats, signaling protocols and address information in order to permit communication between the different networks. Serving GPRS Support Node (SGSN) 117 provides packet routing to and from a SGSN service area, and serves GPRS subscribers which are physically located within the SGSN service area. Serving GPRS Support Node (SGSN) 117 provides functions such as authentication, ciphering, mobility management, charging data, and logical link management toward the user equipment unit. A GPRS subscriber may be served by any SGSN in the network depending on location. The functionality of Serving GPRS Support Node (SGSN) 117 and Gateway GRPS support node (GGSN) 118 may be combined in the same node, or may exist in separate nodes as shown in FIG. 9A.

In the FIG. 9A embodiment, the General Packet Radio Service (GPRS) Service (SGSN) node 117 of core network node 112 is also shown as hosting the header compressor 25-9A. The structure and operation of header compressor 25-9A is essentially similar to that of the embodiments of header compressor 25 described previously.

The core network 112 connects to radio access network 110 over a radio access network interface depicted by dot-dashed line 122. The radio access network 110 includes one or more control nodes 126 and one or more radio base stations (BS) 128. In an example, non-limiting implementation in which radio access network 110 is a UMTS Terrestrial Radio Access Network (UTRAN), the radio access network interface depicted by dot-dashed line 122 is known as the Iu interface, and the control nodes 126 take the form of radio network controllers (RNCs). The person skilled in the art understands the function and constituency of radio network control node 126, such as a diversity handover unit, controller(s), and various interfaces, for example. In other implementations of radio access network 110, the control nodes 126 can have other names, such as base station controller (BSC), radio network control node, etc. In any event, it should be understood that, for sake of simplicity, the radio access network 110 of FIG. 9A is shown with only one control node 126, with the control node 126 being connected to two base stations (BS) 128. As understood by those skilled in the art, the radio access network 110 typically has numerous control nodes 126, which can be connected over an unillustrated interface (such as an Iur interface).

Again for sake of simplicity, only two base station nodes 128 are shown connected to the representative control node 126. It will be appreciated that a different number of base stations 128 can be served by each control node 126, and that control nodes 126 need not serve the same number of base stations. Further, those skilled in the art will also appreciate that a base station is sometimes also referred to in the art as a radio base station, a node B, or B-node.

For brevity it is assumed in the ensuing discussion that each base station 128 serves one cell. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A remote unit 140 communicates with one or more cells or one or more base stations (BS) 128 over a radio or air interface 138. In differing implementations, the remote unit 140 can be known by different names, such as remote terminal, wireless terminal or wireless unit, mobile station or MS, mobile terminal or MT, or user equipment unit (UE), for example. Of course, whereas for ease of illustration only one remote unit 140 shown in FIG. 9A, each base station typically serves many remote units.

In the example UMTS implementation mentioned above, radio access is preferably based upon Wideband, Code Division Multiple Access (WCDMA) with individual radio channels allocated using CDMA spreading codes. Of course, other access methods may be employed.

The remote unit 140 has a header decompressor 46. The structure and operation of remote unit 140 and of header decompressor 46 are can be, for example, any of the header decompressors aforedescribed in conjunction with any of the aspects hereof. Other unillustrated components of remote unit 140, including the structure and operation of a constituent transceiver, protocol stacks, decoders, buffers, and the alike are understood by the person skilled in the art.

Figure 9B:
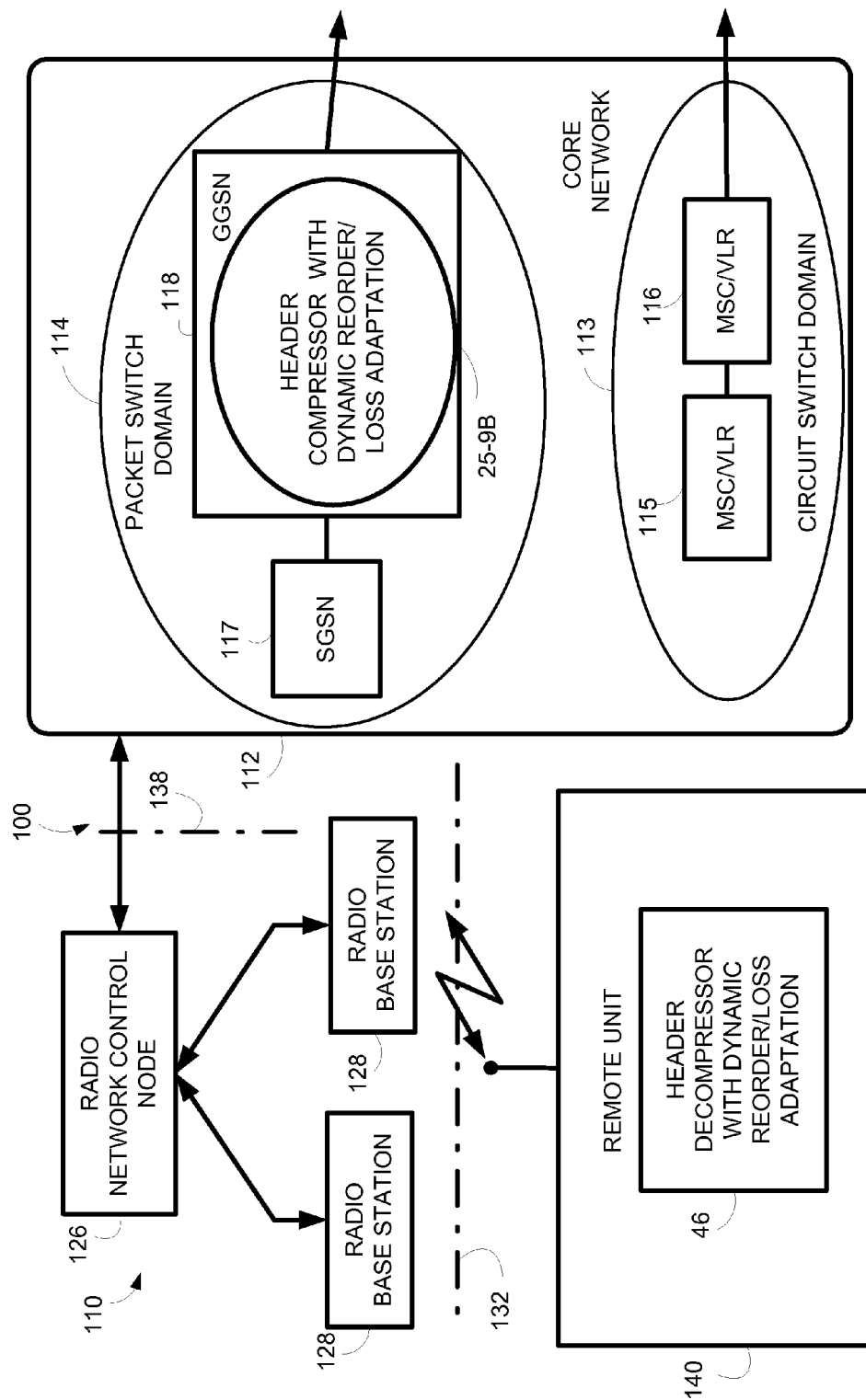
FIG. 9B is a schematic view of a particular telecommunications system which serves as an example context in which the present invention may be employed, and wherein a header compressor is included in a Gateway General Packet Radio Service (GPRS) support node (GGSN).

In the FIG. 9B embodiment, the Gateway General Packet Radio Service (GPRS) support node (GGSN) 118 is shown as hosting the header compressor 25-9B, instead of the hosting being at the SGSN 117. The structure and operation of header compressor 25-9B is essentially similar to any of those described previously.

In the FIG. 9C embodiment, radio network controller node 126 is shown as hosting the header compressor 25-9C, instead of one of the core network nodes. The structure and operation of header compressor 25-9C is essentially similar to any of those header compressors 25 described previously While nodes such as those illustrated in FIG. 9A, FIG. 9B, and FIG. 9C have myriad other elements and functionalities, as understood by the person skilled in the art, illustrated herein are only those elements and functionalities necessary or helpful for illustrating the context information transmission techniques described herein.

It should be noted that even if the generic terms "header compression", "header compressor" and "(header) decompressor" are used to show that the applicability of this idea is not limited to any specific header compression scheme. This is particularly applicable to most ROHC profiles, including—but not limited to—the ROHC-TCP (0x0006), ROHC RTP (0x00001), UDP (0x0002), IP (0x0004), ESP (0x0003), UDP-Lite (0x0008), RTP/UDP-Lite (0x0007) header compression profiles. Some of the proposed solutions also have the advantage of not requiring any change to any of the ROHC standards It should also be understood that the header decompression techniques and other activities described herein need not be performed at nodes or terminals identically structured as those herein illustrated and/or described. Rather, various functions can be distributed or separated to other nodes or devices, or even networks (e.g., core network and radio access network). Moreover, even the header compression functions can be distributed over plural nodes and/or devices, if desired.

In view, e.g., of the foregoing, the term "network node" as employed herein refers to any node or unit, or portion of node or unit, which performs, either in whole or in part, the context information transmission control described herein.

Further, the node or device which hosts the header compressor 25 may or may not be located more than one node or network interface away from a receiving entity. For example, mention herein that context information is sent over an air or radio interface to a receiving entity (e.g., remote unit 40) does not require that the header compressor 25 be situated in a node or location which borders the radio interface.

Advantages provided by the foregoing new technology include one or more of the following:
  The header compression algorithm can be tailored, per flow, to the (expected or observed) characteristics of the link—in terms of reliability vs reordering depth.
  Dynamic—parameters may be signaled using an all-round packet that do not change its format based on the parameters exchanged (from compressor to decompressor), e.g., IR, IR-DYN or a UOR with extension with respect to RFC 3095 [ROHC], or using feedback (from decompressor to compressor). This can be used for long-term link characteristic variations.
  The technology enables that the most efficient packets can be both robust to losses and to reordering when parameters are properly set (or exchanged) with respect to the actual link characteristics (today's state-of-the-art requires that larger packets than necessary be sent)

This technology lends itself to standardization—$P_{var}$ and S and/or other parameters to signal the amount of reordering and consecutive packet losses should be added to, e.g., IR, IR-DYN as well maybe in some extensions [ROHC].

The technology described herein allows a header compression algorithm using the secure reference principle to be used over channels that can reorder packets between compressor and decompressor with much less risk of generating erroneously decompressed packets. This is made possible from adapting the number of coded LSB SN bits to the robustness properties of the secure reference principle, by taking into account the characteristics of reordering.

This is particularly applicable to most ROHC profiles, including—but not limited to—the ROHC RTP (0x0001), UDP (0x0002), IP (0x0004), ESP (0x0003), UDP-Lite (0x0008), RTP/UDP-Lite (0x0007) and TCP (0x0006) header compression profiles.

Depending on embodiment and implementation, features described herein include, but are not limited to, one or more of the following:

The header compressor signals the value representing the offset of the interpretation interval used for the Least Significant Bit (LSB) encoding, as well as the as well as the value for the number of additional bits used to represent the encoded field. These values represent the characteristics of the link where header compression is used in terms of reordering and consecutive packet losses.

The header compressor expands the number of LSB-encoded bits for the sequence number based on the values signaled with respect to reordering and consecutive packet losses.

The header decompressor maintains in its state the values received by the compressor with respect to reordering and consecutive packet losses.

The header decompressor uses the value maintained with respect to the number of LSB-coded sequence number bits that are present (or in excess of the static definition of the packet formats) to extract the corresponding field.

The header decompressor uses the value received by the compressor when interpreting the interval when LSB-decoding the bits received as LSB-coded sequence number bits.

The header compressor may signal new values for the parameters at any time, e.g. based on an explicit change of bearer (link) properties (such one or more of round-trip time (RTT), delays, a number of retransmissions (radio link control (RLC) and/or Hybrid Automatic Retransmission ReQuest (H-ARQ), handover events, buffer levels, change in configuration, change in quality of service (QoS) parameters, link reset, Service Data Unit (SD) discards, and bit error rate measurements, etc.

Also, as other features, depending on embodiment and implementation, the decompressor signals dynamic parameters for the LSB coding. For example:

The header compressor may initially use configured or default parameters for the value representing the offset of the interpretation interval used for the Least Significant Bit (LSB) encoding, as well as the value for the number of additional bits used to represent the encoded field.

The header decompressor may monitor reliability and reordering characteristics of the link.

The header decompressor signals the value representing the offset of the interpretation interval used for the Least Significant Bit (LSB) encoding, as well as the value for the number of additional bits used to represent the encoded field. This may be done using feedback messages. These values represent the characteristics of the link where header compression is used in terms of reordering and consecutive packet losses.

The header compressor expands the number of LSB-encoded bits for the sequence number based on the values signaled by the decompressor with respect to reordering and consecutive packet losses, once a proper handshake as taken place so that the transition is synchronized with the decompressor (e.g., using a three-way handshake).

The header decompressor may signal new values for the parameters at any time, e.g., based on observed link characteristics or based on a more explicit change of bearer (link) properties (such as a handoff, or a change in configuration, or a change in QoS).

Various features may be combined. For example, using self-describing variable encoded values for the field carrying the LSB-coded bits (instead of maintaining a context value for the number of additional LSB-coded bits). This may occur as one or more of the following:

The header compressor, functioning as above described, wherein self-describing variable encoding is applied to the field carrying the LSB-coded bits within the packet formats take require a dynamic number of LSB-coded bits Header decompressor, functioning as above described, wherein the field carrying the LSB-coded bits are interpreted using packets received are interpreted as self-describing variable encoded values (thus no need to maintain a context value for this).

As another example of feature combination, self-describing encoded values may be used for the field carrying the LSB-coded bits (instead of maintaining a context value for the number of additional LSB-coded bits). This may occur as one or more of the following:

The header compressor, functioning as above described, wherein self-describing encoding is applied to the field carrying the LSB-coded bits within the packet formats take require a dynamic number of LSB-coded bits.

Header decompressor, functioning as above described, wherein the field carrying the LSB-coded bits are interpreted using packets received are interpreted as self-describing encoded values (thus no need to maintain a context value for this).

In the above regard, the header compressor may expand the number of LSB-encoded bits for the sequence number based on the values signaled by the decompressor with respect to reordering and consecutive packet losses, without any handshake. Because self-describing variable encoding value is used, there is no need to synchronize the change in packet formats with the decompressor.

The header compressor and/or decompressor may be implemented according to [ROHC], [IP-ONLY], [ROHC-TCP], [ROHC-UDPLite] and/or any other header compression schemes in general.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A method of operating a telecommunications network comprising:
performing, at a compressor of a telecommunications node or terminal, a compression operation with respect to packet header information to form compressed packet headers, the compression operation performed by the compressor comprising:
  compressing a header in a first packet destined to be transmitted over a wireless link in accordance with a first format, wherein the first format is associated with a first number of sequence number bits, and wherein the compressed header of the first packet includes the first number of sequence number bits;
  deciding, based on a characteristic of the wireless link, whether to adjust a packet format used by the compressor and, in response to deciding to adjust the first packet format:
    determining an enhancement factor;
    determining a second number of sequence number bits based on the first number of sequence number bits and the enhancement factor;
    signaling information to a decompressor indicating the enhancement factor; and
  compressing a header in a second packet, wherein a sequence number of the compressed header of the second packet includes the second number of compressed bits;
transmitting the packets from the compressor to the decompressor over the wireless link, the packets being susceptible to reordering during transmission over the wireless link, the decompressor being at another telecommunications node or terminal; and
performing a decompression operation at the decompressor,
wherein the dynamically adjusting of the tradeoff occurs during transmission of a flow of header-compressed packets including the first packet and the second packet over the wireless link from the compressor which performs the compression operation to the decompressor which performs the decompression operation.

2. The method of claim 1, further comprising the decompressor, which performs a decompression operation, signaling the information across the wireless link to the compressor.

3. The method of claim 2, further comprising synchronizing a transition to a new packet format which reflects dynamic adjustment of the tradeoff.

4. The method of claim 3, wherein the adjustment of the tradeoff results in a new packet format, and further comprising carrying in a field of the new packet format an indication of a size parameter of the new packet format, thereby obviating synchronization across the wireless link regarding the new packet format.

5. The method of claim 4, wherein the size parameter is a number of bits in a sequence number field of the new packet format.

6. The method of claim 1, wherein the reordering depth is dependent upon the interpretation interval offset and the robustness is dependent upon the number of compressed bits and the interpretation interval offset, and wherein dynamically adjusting the tradeoff comprises dynamically changing during the compression operation and the decompression operation at least one of the number of compressed bits and the interpretation interval offset.

7. The method of claim 6, wherein the number of compressed bits is expressed by a factor k and an enhancement factor S, and further comprising dynamically changing the number of compressed bits by changing the enhancement factor S.

8. The method of claim 1, wherein dynamically adjusting the tradeoff results in a change in a number of least significant sequence number bits in the packet header.

9. A telecommunications node or terminal comprising:
a compressor configured to:
  compress a header in a first packet destined to be transmitted over a wireless link in accordance with a first format, wherein the first format is associated with a first number of sequence number bits, and wherein the compressed header of the first packet includes the first number of sequence number bits;
  decide, based on a characteristic of the wireless link, whether to adjust a packet format used by the compressor; and
  in response to deciding to adjust the first packet format:
    determine an enhancement factor;
    determine a second number of sequence number bits based on the first number of sequence number bits and the enhancement factor;
    signal information to a decompressor indicating the enhancement factor; and
    compress a header in a second packet, wherein a sequence number of the compressed header of the second packet includes the second number of compressed bits; and
a transceiver configured to transmit the packets over the wireless link, the packets being susceptible to reordering during transmission over the wireless link,
wherein the dynamically adjusting of the tradeoff occurs during transmission of a flow of header-compressed packets including the first packet and the second packet over the wireless link from the compressor to the decompressor.

10. The apparatus of claim 9, wherein the adjustment of the tradeoff results in a new packet format, and wherein a field of the new packet format carries an indication of a size parameter of the new packet format, thereby obviating synchronization across the wireless link regarding the new packet format.

11. The apparatus of claim 10, wherein the size parameter is a number of bits in a sequence number field of the new packet format.

12. The apparatus of claim 9, wherein the number of compressed bits is expressed by a factor k and an enhancement factor S, and wherein the node or terminal is configured to dynamically change the number of compressed bits by changing the enhancement factor S.

13. The apparatus of claim 12, wherein the node or the terminal is configured to signal the enhancement factor S and the interpretation interval offset to a decompressor across the wireless link.

14. The apparatus of claim 9, wherein the compressor is configured to dynamically adjust the tradeoff of robustness and reordering depth on a per-packet basis or at any time during the compression operation.

15. A telecommunications node or terminal comprising:
a transceiver configured to receive, over a wireless link:
  signal information from a compressor indicating an enhancement factor;
  a flow of packets comprising compressed headers, the packets having been susceptible to reordering during transmission over the wireless link;

a decompressor configured to perform a decompression operation with respect to the compressed headers of the packets which were compressed based on a number of compressed bits wherein a sequence number of the compressed headers includes the number of compressed bits and to adjust, in accordance with a characteristic of the link, an interpretation interval utilized for the decompression operation by changing at least one of a number of compressed bits of a sequence number of the headers and an interpretation interval offset;

wherein the dynamically adjusting of the tradeoff occurs during transmission of the flow of packets over the wireless link from the compressor to the decompressor.

16. The apparatus of claim 15, wherein the adjustment of the tradeoff results in a new packet format, and wherein a field of the new packet format carries an indication of a size parameter of the new packet format, thereby obviating synchronization across the wireless link regarding the new packet format.

17. The apparatus of claim 16, wherein the size parameter is a number of bits in a sequence number field of the new packet format.

18. The apparatus of claim 15, wherein the number of compressed bits is expressed by a factor k and an enhancement factor S, and wherein the node or terminal dynamically changes the number of compressed bits by changing the enhancement factor S.

19. The apparatus of claim 15, wherein the decompressor is configured to dynamically adjust the tradeoff of robustness and reordering depth on a per-packet basis or at any time during the compression operation.

20. The telecommunications node or terminal of claim 15, wherein the compressor is configured to:
compress a header in a first packet destined to be transmitted over a wireless link in accordance with a first format, wherein the first format is associated with a first number of sequence number bits, and wherein the compressed header of the first packet includes the first number of sequence number bits;
decide, based on a characteristic of the wireless link, whether to adjust a packet format used by the compressor; and
in response to deciding to adjust the first packet format:
determine the enhancement factor;
determine a second number of sequence number bits based on the first number of sequence number bits and the enhancement factor;
signal information to a decompressor indicating the enhancement factor; and
compress a header in a second packet, wherein a sequence number of the compressed header of the second packet includes the second number of compressed bits.

* * * * *